United States Patent [19]
Sato et al.

[11] Patent Number: 5,565,893
[45] Date of Patent: Oct. 15, 1996

[54] COORDINATE INPUT APPARATUS AND METHOD USING VOLTAGE MEASURING DEVICE

[75] Inventors: Hajime Sato, Yokohama; Masaki Tokioka, Fujisawa; Atsushi Tanaka, Kawasaki; Katsuyuki Kobayashi, Yokohama; Yuichiro Yoshimura, Kamakura; Ryozo Yanagisawa, Inzal-machi, all of Japan

[73] Assignee: Canon Kabushiki Kaisha, Tokyo, Japan

[21] Appl. No.: 237,894

[22] Filed: May 4, 1994

[30] Foreign Application Priority Data

May 7, 1993 [JP] Japan ..................... 5-106641
May 24, 1993 [JP] Japan ..................... 5-121213

[51] Int. Cl.$^6$ ........................................ G09G 5/00
[52] U.S. Cl. ................................. 345/177; 178/18
[58] Field of Search ........................... 345/177, 173, 345/179, 156; 178/18, 19

[56] References Cited

U.S. PATENT DOCUMENTS

| | | |
|---|---|---|
| 3,504,334 | 3/1970 | Turnage, Jr. . |
| 4,567,565 | 1/1986 | Haselby et al. ............... 364/520 |
| 4,886,943 | 12/1989 | Suzuki et al. ................. 178/18 |
| 4,897,510 | 1/1990 | Tanaka et al. ................. 178/18 |
| 4,910,363 | 3/1990 | Kobayashi et al. ............. 178/18 |
| 4,931,965 | 6/1990 | Kaneko et al. ................ 364/560 |
| 4,980,518 | 12/1990 | Kobayashi et al. ............. 178/18 |
| 5,017,913 | 5/1991 | Kaneko et al. ................ 340/712 |
| 5,070,325 | 12/1991 | Tanaka et al. ................. 340/706 |
| 5,073,685 | 12/1991 | Kobayashi et al. ............. 178/19 |
| 5,097,102 | 3/1992 | Yoshimura et al. ............. 178/18 |
| 5,142,106 | 8/1992 | Yoshimura et al. ............. 178/18 |
| 5,239,138 | 8/1993 | Kobayashi et al. ............. 178/18 |

FOREIGN PATENT DOCUMENTS 027527  7/1986  European Pat. Off. .
61-168031  7/1986  Japan .

*Primary Examiner*—William Cumming
*Assistant Examiner*—Vivian Chang
*Attorney, Agent, or Firm*—Fitzpatrick, Cella, Harper & Scinto

[57] ABSTRACT

A high-precision coordinate input apparatus having a small circuit construction. A vibrating pen transmits vibration onto a vibration transmitting tablet, then vibration sensors provided at corners of the vibration transmitting tablet detect the vibration. One of the vibration sensor is used as a reference sensor. Time difference between vibration detecting timing by this reference sensor and detecting timing by one of the other sensors is measured. This measurement is performed on all the vibration sensors with respect to the reference sensor. The obtained time differences are converted into distance differences for calculation of the coordinates of the position in which the vibration has been generated. The vibrating pen has a power source and it operates independent of the apparatus main body. The vibrating pen changes its frequency of vibration in accordance with the voltage of the power source. The apparatus main body captures this change in the vibration frequency and obtain the state of the vibration pen power source.

20 Claims, 16 Drawing Sheets

COORDINATE INPUT APPARATUS AND METHOD USING VOLTAGE MEASURING DEVICE

BACKGROUND OF THE INVENTION

1. Field of Invention

Present invention relates to a coordinate input apparatus which detects input vibrations and specifies the position of the vibration source so as to determine the coordinates of the vibration input position.

2. Related Art

Conventional coordinate input apparatuses utilizing ultrasonic vibration detect vibration inputted from a vibrating pen by a plurality of sensors on a vibration transmitting panel. The coordinates at the vibrating pen input position on the vibration transmitting panel is determined based on difference data, obtained from delay times at the respective sensors, calculated using a reference delay time from a point where the vibration is inputted to a point where one of the sensors (e.g., the sensor that first receives the vibration), as a reference sensor, detects the vibration.

As shown in FIG. 11, the above coordinate input apparatus calculates coordinates using the following equations in accordance with the positional relation between vibration sensors S1 to S4 on the vibration transmitting panel and a vibration input point P (x, y) : $\Delta db$–$\Delta dd$ calculated from the difference data among the delay times are:

$$\Delta db = db - da \tag{101}$$

$$\Delta dc = dc - da \tag{102}$$

$$\Delta dd = dd - da \tag{103}$$

Point P(x, y) is obtained from:

$$x = \frac{x}{2} - \frac{\Delta dd^2}{2x} + \frac{\Delta dd(\Delta db^2 + \Delta dd^2 - \Delta dc^2)}{2X(\Delta db + \Delta dd - \Delta dc)} \tag{104}$$

$$y = \frac{y}{2} - \frac{\Delta dd^2}{2x} + \frac{\Delta db(\Delta db^2 + \Delta dd^2 - \Delta dc^2)}{2Y(\Delta db + \Delta dd - \Delta dc)} \tag{105}$$

Note that the equations (104) and (105) hold if:

$$\Delta db + \Delta dd - dc \neq 0 \tag{106}$$

If $$\Delta db + \Delta dd - \Delta dc = 0 \tag{107}$$

the point P (x, y) is:

$$x = \frac{X}{2} \tag{108}$$

$$y = \frac{Y \pm \sqrt{A}}{2} \tag{109}$$

$$A = \Delta db^2 \left(1 + \frac{X^2}{Y^2 - \Delta db^2}\right) \tag{110}$$

Otherwise, the point P(x, y) is:

$$y = \frac{Y}{2} \tag{111}$$

$$x = \frac{X \pm \sqrt{B}}{2} \tag{112}$$

$$B = \Delta dd^2 \left(1 + \frac{Y^2}{X^2 - \Delta dd^2}\right) \tag{113}$$

However, the above conventional coordinate determination method is implemented by simply assigning a start and stop signals of a counter to the respective signals, and measuring the time difference. When a plurality of signals are detected upon obtaining the difference data, the relation between group delay time and phase delay time at each sensor is reversed, causing erroneous judgment of the reference delay time.

If two counters are used, the size of the counters must be greater than the repetition period of a signal source. This increases the apparatus construction cost.

Further, the above coordinate calculation method has a drawback in that if the equation (106) holds, the results from the equations (104) and (105) tend to cause errors in the equations (108) and (111).

Generally, the conventional apparatus of this type measures time from a point where vibration generated by the vibrating pen is inputted to a point where the vibration reaches one of the vibration sensors provided at predetermined positions on the vibration transmitting panel, and calculates the distances between the vibrating pen and the vibration sensors, i.e., coordinates designated by the vibration pen, based on the measured values.

Especially, in a wireless type apparatus in which a vibrating pen and a coordinate input apparatus main body are not connected with a cord such as a power supply line and a signal line, the vibrating pen itself incorporates a power source, a vibrator and a vibrator driver.

In a case where this vibrating pen uses a power source such as a battery, the pen does not work as the power source is depleted and the power source must be exchanged. Preferably, in case of malfunction of the vibrating pen, whether the apparatus main body is out of order or the power source is depleted can be easily judged, more specifically, the pen itself has a function to inform a user of the deterioration of the power source. However, assuming that the pen has a display function to indicate residual power using, e.g., an LCD, as a rechargeable shaver, the number of electric parts to be incorporated in the pen increases. This enlarges the size of the vibrating pen, and further, raises consumption requirement of the power source. Even if a device for notifying the power-source state to the apparatus main body is provided, and the apparatus main body displays the informed power-source state, a similar problem may occur.

SUMMARY OF THE INVENTION

The present invention has been made in consideration of the above situation, and has as its object to provide a coordinate input apparatus having a small-sized circuit construction and improved coordinate-input precision.

Another object of the present invention is to provide a coordinate input apparatus in which an apparatus main body and a vibrating input pen operate separately, for improvement of operability.

Further object of the present invention is to provide a coordinate input apparatus which reduces coordinate calculation errors and attains coordinate input with high-precision.

Still further object of the present invention is to provide a small-sized, power-saving type voltage measuring device for notifying a user of residual electric power at a vibration input power source, and a coordinate input apparatus using the voltage measuring device.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS.

Preferred embodiments of the present invention will be described in detail in accordance with the accompanying drawings.

[First Embodiment]
<Apparatus Configuration>

Figure 1:
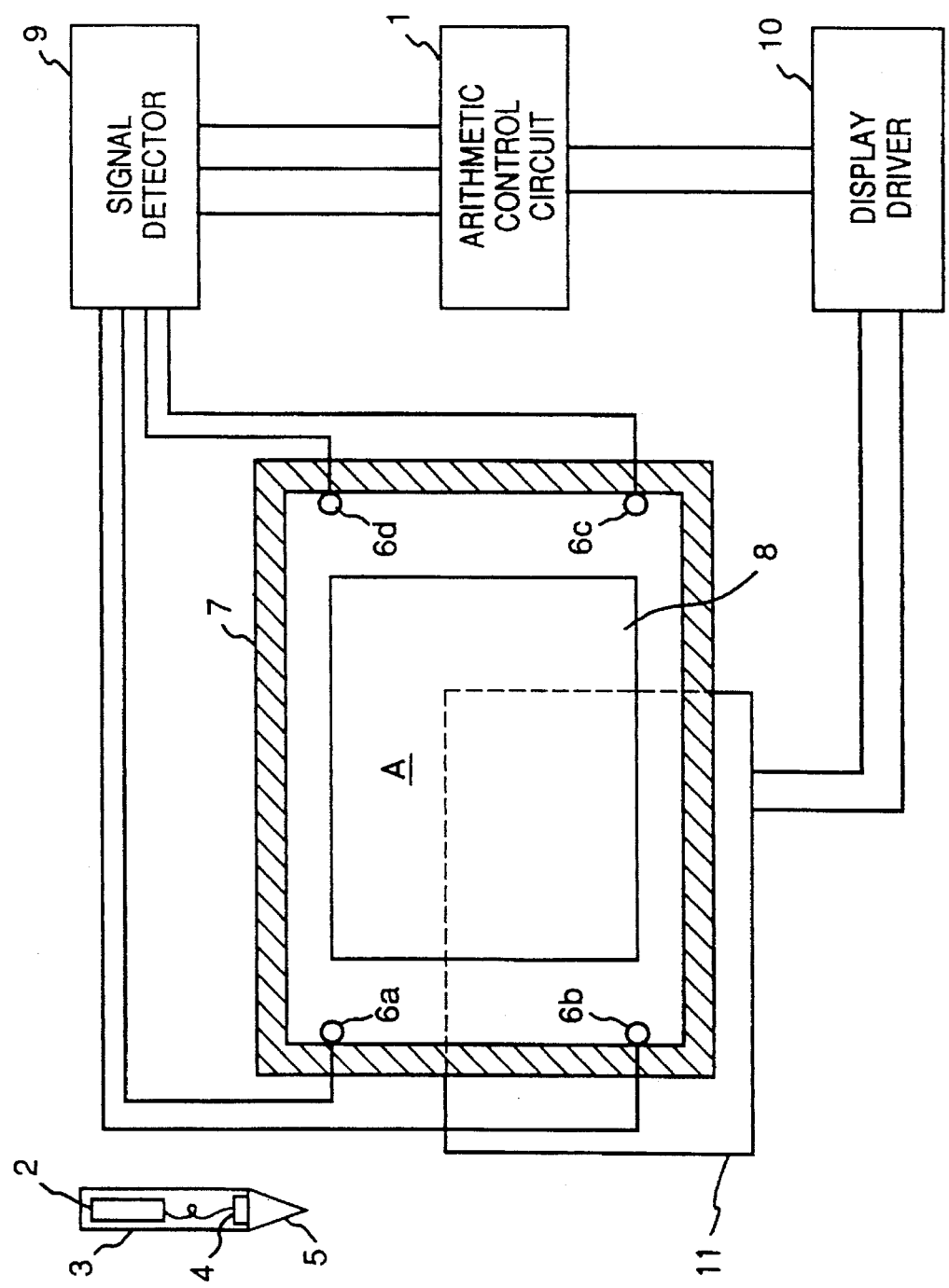
FIG. 1 is a block diagram showing the configuration of a coordinate input apparatus according to first to third embodiments of the present invention.

FIG. 1 shows the configuration of the coordinate input apparatus according to the first embodiment. In FIG. 1, an arithmetic control circuit 1 controls the overall apparatus and calculates coordinates at a vibration input position. A vibrator driver 2, incorporated in a vibrating pen 3, drives a vibrator 4 in the vibrating pen 3 to vibrate a pen tip 5. A vibration transmitting tablet 8 comprises a transparent member such as an acrylic resin plate and a glass plate. The coordinate-input is made by contacting the vibrating pen 3 with the vibration transmitting tablet 8. As a position within an area A (effective area) represented by a solid line in FIG. 1 is designated using the vibrating pen 3, vibration from the pen 3 is transmitted on the vibration transmitting tablet 8 and measured, and then processing for calculation of coordinates at the designated position is performed.

The vibration transmitting tablet 8 has a vibration suppressor 7 at its ends to reduce reflection waves reflected from the ends of the panel 8 towards the center of the panel. As shown in FIG. 1, vibration sensors 6a to 6d comprising such as a piezoelectric element, for converting mechanical vibration into an electric signal, are fixed at inner side surface of the vibration suppressor 7. A signal detector 9 outputs signals detected from the sensors 6a to 6d to the arithmetic control circuit 1. The display 11, comprising such as an LCD, is capable of dot-based representation. The display 11, located under the vibration transmitting tablet 8, driven by a display driver 10, displays a dot at a position designated by the arithmetic control circuit. A user can see the display through the transparent vibration transmitting tablet 8.

Vibration frequency of the vibrator 4 is selected to have a value capable of generating Lamb waves upon the vibration transmitting tablet 8. Upon driving the vibrator, a mode for vibration in a vertical direction with respect to the vibration transmitting tablet 8 is selected. Further, selecting a resonance frequency of the pen tip 5 as the vibration frequency of the vibrator 4 enables effective vibration conversion. Thus, elastic waves to be transmitted on the vibration transmitting tablet 8 are plate waves which, compared with a surface wave, advantageously receive smaller influence from scratches (flaws) and obstacles on the transmitting panel surface.

<Arithmetic Control Circuit>

In the above construction, the vibrator driver 2 outputs a signal to drive the vibrator 4 in the vibrating pen 3 at predetermined intervals (e.g., 5 ms). Thus-generated vibration from the vibrating pen 3 is transmitted on the vibration transmitting tablet 8, and received by the vibration sensors 6a to 6d, at respective delay times, in accordance with the distances from the vibration input-point.

The signal detector 9 detects signals from the vibration sensors 6a to 6d, and generates signals indicative of time differences between transmission timing to the sensor 6a as a reference timing and the respective transmission timings to the other sensors 6b to 6d. The arithmetic control circuit 1 inputs these time difference signals regarding all comparisons between the reference timing and the transmission timings to the other sensors, measures differences between the reference delay time and the respective delay times, and calculates coordinates at the input position by the vibrating pen based on the measured differences. The arithmetic control circuit 1 drives the display driver 10 based on the calculated position information of the pen 3, to control display 11, further, performs serial communication or parallel communication to output the coordinates to an external device (not shown).

Note that hereinafter, time from a point where vibration transmission is inputted onto the vibration transmitting tablet to a point where a sensor receives the vibration is referred to as "delay time" of the sensor. Also, the difference between the reference delay time and the delay time of the other sensor is simply referred to as "difference data".

<Construction of Arithmetic Control Circuit>

Figure 2:
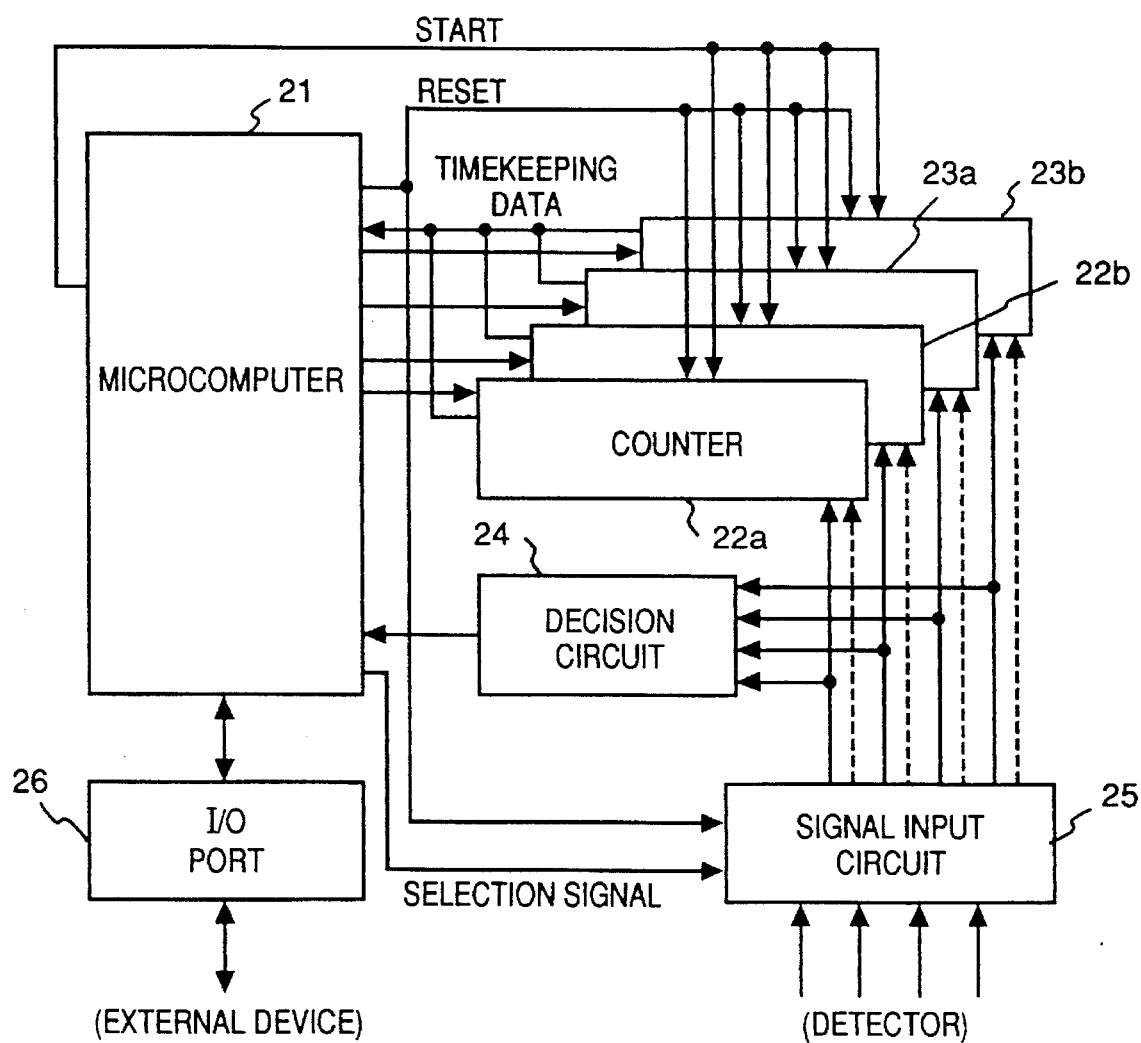
FIG. 2 is a block diagram showing the construction of an arithmetic control circuit in FIG. 1.

FIG. 2 shows the construction of the arithmetic control circuit 1.

In FIG. 2, a microcomputer 21 controls the arithmetic control circuit 1 and the overall coordinate input apparatus. The microcomputer 21 comprises a counter, a ROM in which operation procedures are stored, a RAM used for calculation and a non-volatile memory for storing constants. Counters 22a, 22b, 23a and 23b measure delay times from the start of vibration transmission to respective points where the vibration sensors 6a to 6d detect the vibration. The present embodiment has four counters for inputting the delay time signals indicative of delay time at the reference vibration sensor 6a and delay times at the other vibration sensors 6b to 6d.

A signal input circuit 25 inputs the delay time signals from the sensors 6a to 6d outputted from the signal detector 9 into the counters 22a, 22b, 23a and 23b. More specifically, the input circuit 25 inputs a signal Tga, indicative of group delay time at the sensor 6a, to the counter 22a; signals Tgb to Tgd, indicative of group delay times at the sensors 6b to 6d, to the counter 22b; a signal Tpa, indicative of phase delay time at the sensor 6a, into the counter 23a; and signals Tpb to Tpd, indicative of phase delay times at the sensors 6b to 6d, into the counter 23b.

A decision circuit 24 judges that the signals have been received, and outputs a judgment signal to the microcomputer 21 to inform the judgment result. The microcomputer 21 performs a predetermined calculation to obtain coordinates at the input position by the vibrating pen 3 on the vibration transmitting tablet 8. The microcomputer 21 outputs coordinate information to the display driver 10 via the I/O port 26, to display a dot at the corresponding position of the display 11. Otherwise, the microcomputer 21 may output the information via the I/O port 26 to an interface circuit, to output the coordinate value to an external device.

<Operation of Arithmetic Control Circuit>

Figure 3:
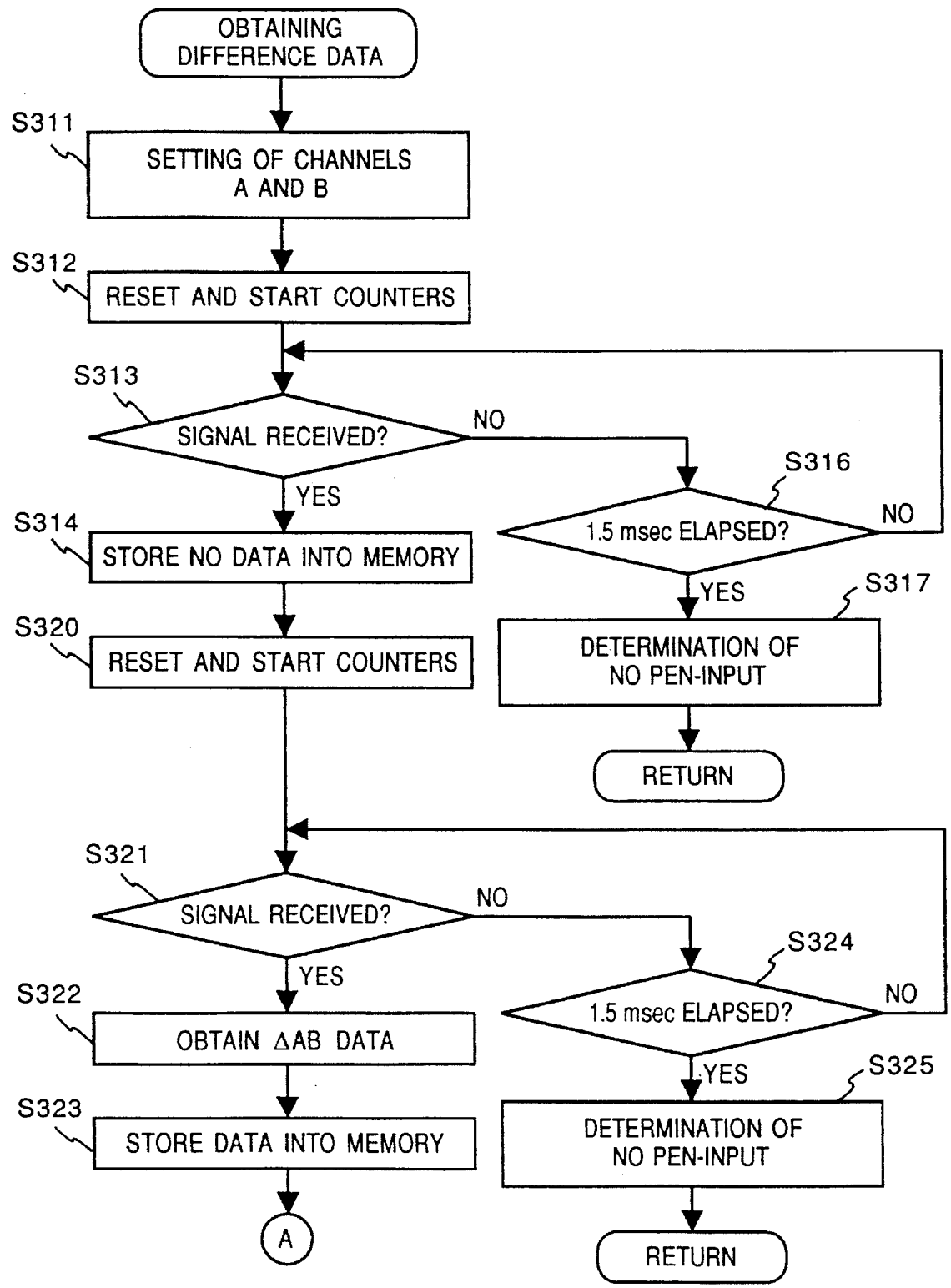
FIGS. 3 to 5 are flowcharts showing data processing according to the first embodiment.
Figure 4:
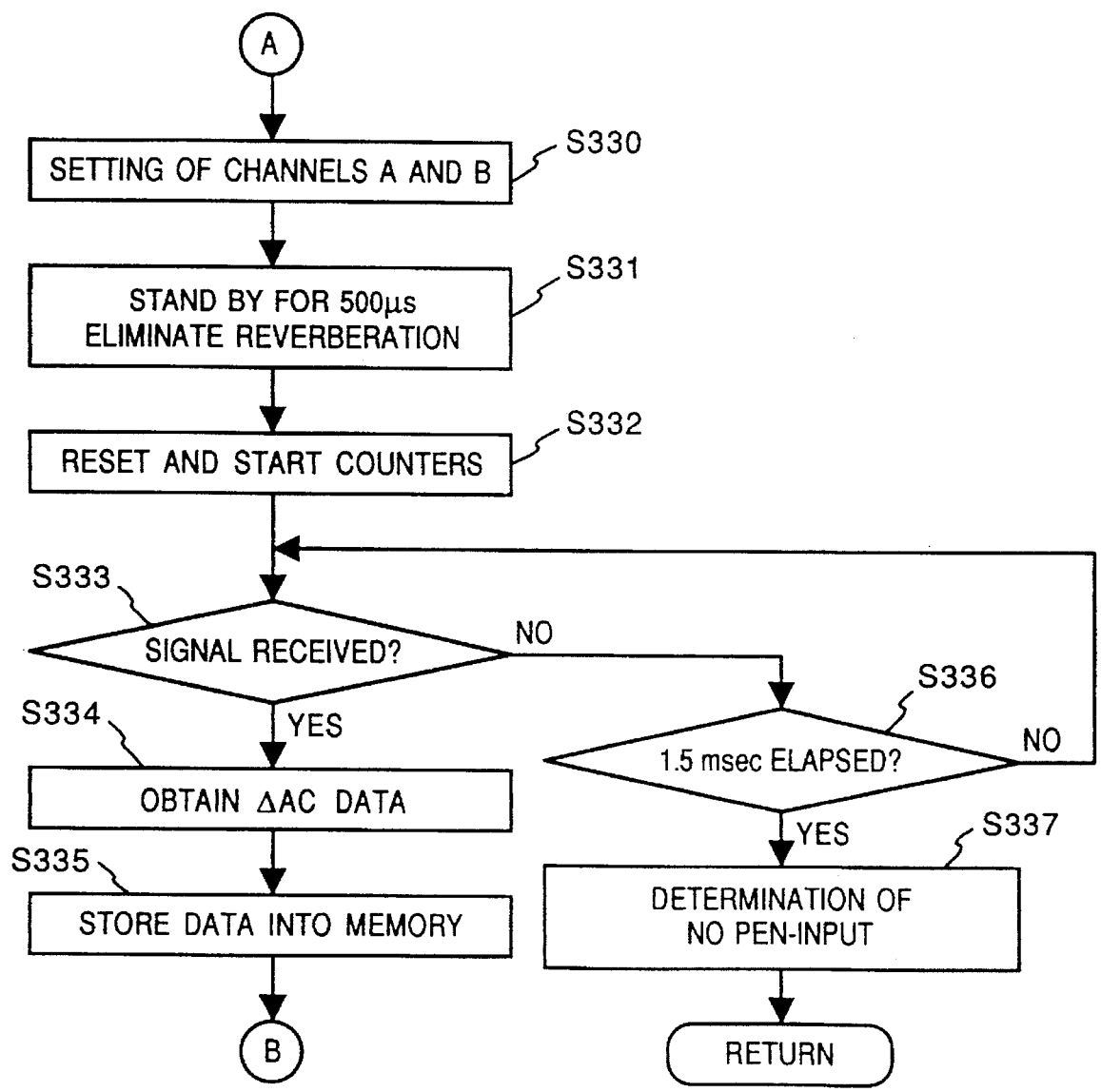
Figure 5:
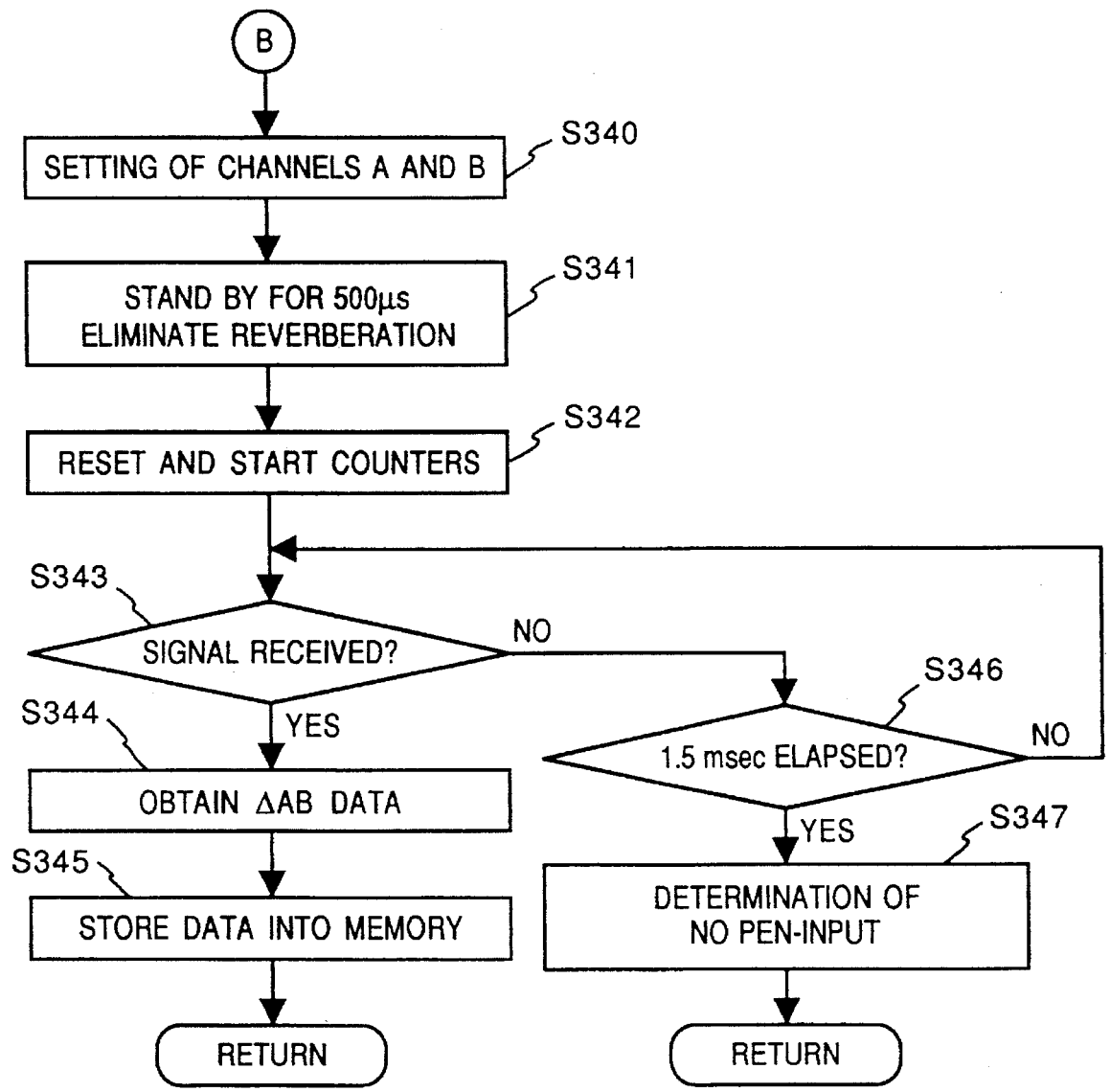
Figure 6:
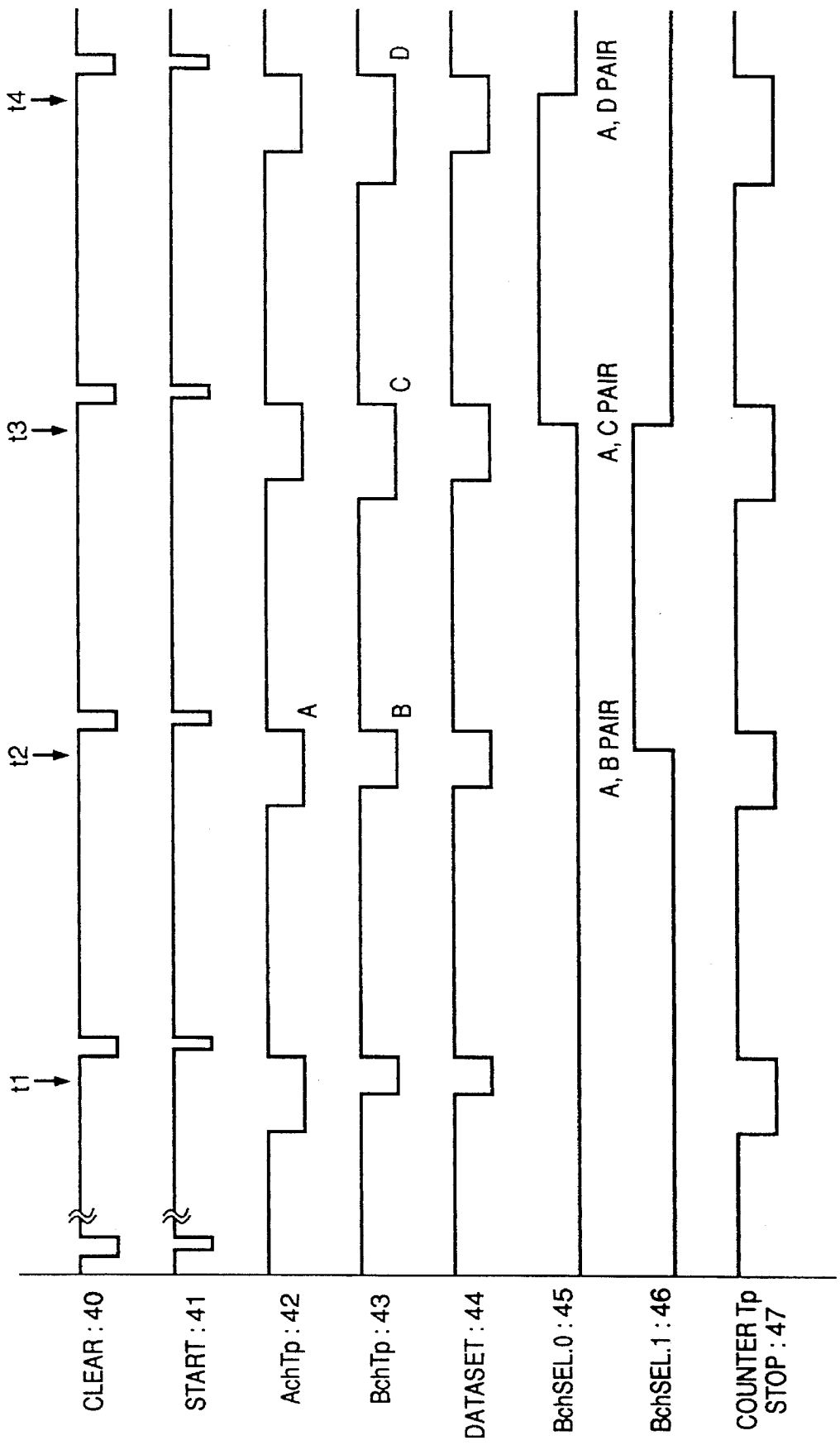
FIG. 6 is a timing chart of the data processing.

Next, the operation of the arithmetic control circuit 1 will be described with reference to the flowcharts in FIGS. 3 to 5 and the timing chart in FIG. 6. FIGS. 3 to 5 show the operation of the arithmetic control circuit 1 to obtain difference data regarding one vibration sensor. FIG. 6 shows the respective signal timings in accordance with the flowcharts in FIGS. 3 to 5. In FIG. 6, a clear signal 40 and a start signal 41 are provided from the microcomputer 21 to the counters for instructing clearing and starting of the counters. A channel-A Tp signal 42 and a channel-B Tp signal 43 respectively correspond to signal 78 or 79 in FIG. 9 to be described later. It should be noted that as the description here is made upon operation for obtaining difference data of the respective sensors, the signals regarding group delay times are omitted in FIG. 6.

A channel-B $SEL_0$ signal 45 and a channel-B $SEL_1$ signal 46 are selection signals for channel-B sensors.

In FIGS. 3 to 5, channel-A and channel-B are switched in step S311. Channel-A is set to input the signal from the reference vibration sensor 6a, while channel-B is set to input the signal from the sensor 6b. The sensor as a signal source for the channel-B input is changed by the signal 45 or 46. In step S312, all the counters are reset by a reset signal CLEAR outputted from the microcomputer 21, and the four counters corresponding to channel-A and channel-B are started by a start signal START also outputted from the microcomputer 21. In step S313, reception of signal is determined by the decision circuit 24. If NO, signal input is awaited in step S316 for a predetermined period, e.g., 1.5 msec, thereafter, it is judged that the vibrating pen 3 has not transmitted vibration onto the vibration transmitting tablet 8 in step S317.

In step S314, the data is discarded (timing t1 in FIG. 6) for improvement of reliability of data, since the first signal might be indicative of incorrect value due to influence of reverberation or the like. In step S320, the counters are cleared and restarted. In step S321, whether or not the second signal has been inputted into channel-A from the reference sensor 6a is determined. The count values of the counters 22a and 23a are stored into the memory and the count values of the counters 22b and 23b halted by the signal from the sensor 6b are stored into the memory. In step S322, the microcomputer performs calculation according to equations $\Delta Tb = Tgb - Tga$ and $\Delta Tpb = Tpb - Tpa$, using obtained counter values Tga, Tgb, Tpa and Tpb, and stores the calculation results into the memory in step S323.

Next, channel-B is set to input a signal from the sensor 6c, and a similar processing is performed. In step S330, the process is in stand-by state for 500 msec to eliminate reverberation. Then, the first pulse is used as a signal for distance calculation.

Similarly, channel-B is set to input a signal from the sensor 6d, and a similar processing is performed.

As the microcomputer 21 has calculated the difference data of the reference sensor 6a and the sensors 6b to 6d, it further calculates the coordinates of an input position from those data. The microcomputer 21 performs the above operation as interruption.

The counters 22a to 23b are finite counters where the maximum count value is determined based on the largest difference data determined from a transmission speed of vibration of the pen 3 on the vibration transmitting tablet 8 and an input area. In the present embodiment, the maximum count value is equal to or greater than a doubled value of the largest difference data.

Figure 7:
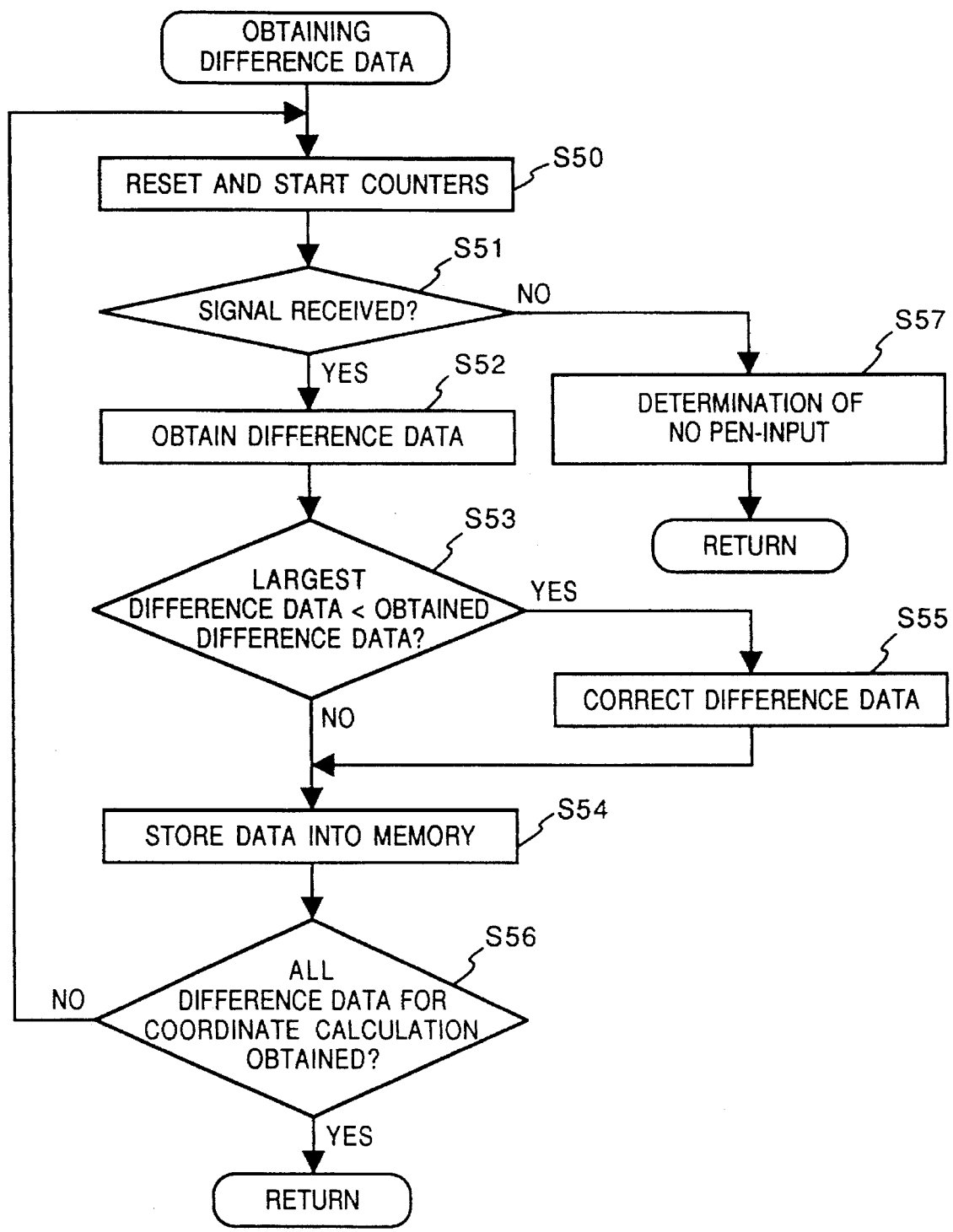
FIG. 7 is a flowchart showing data correction in the data processing in FIG. 6.

The difference data obtained in steps S322, S334 and S344 in FIGS. 3 to 5 are processed as shown in steps S52 to S55 in the flowchart in FIG. 7, and stored into the memory of the microcomputer 21.

Figure 8A:
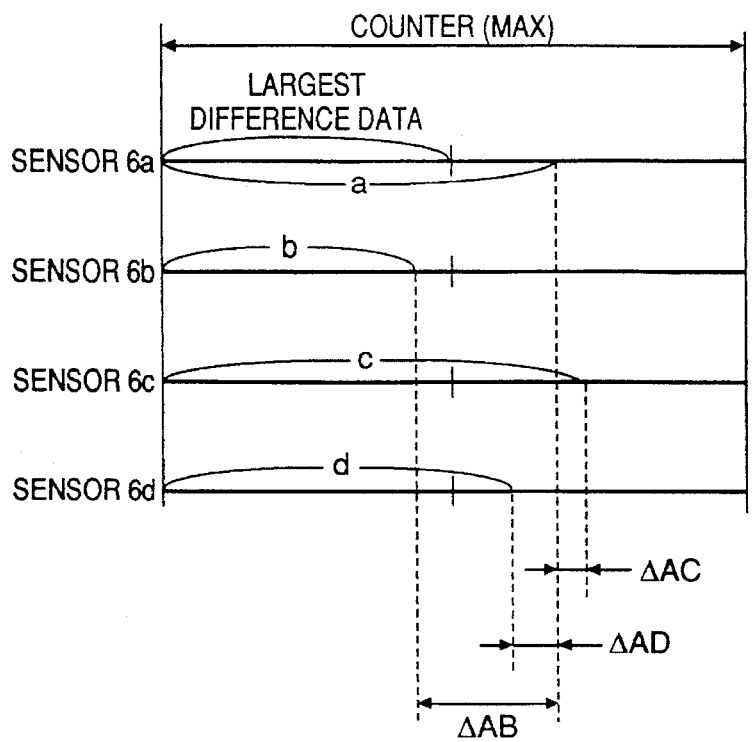
FIGS. 8A to 8C illustrate the data correction.
Figure 8B:
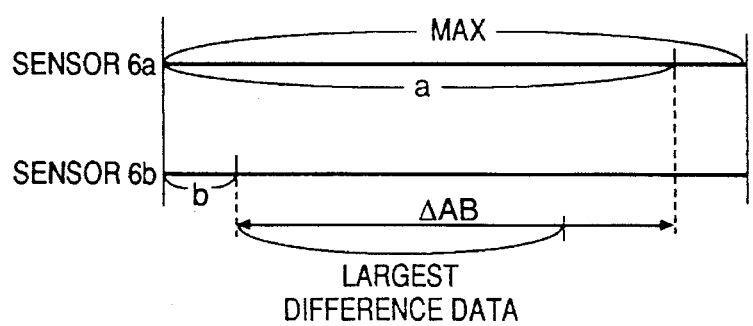
Figure 8C:
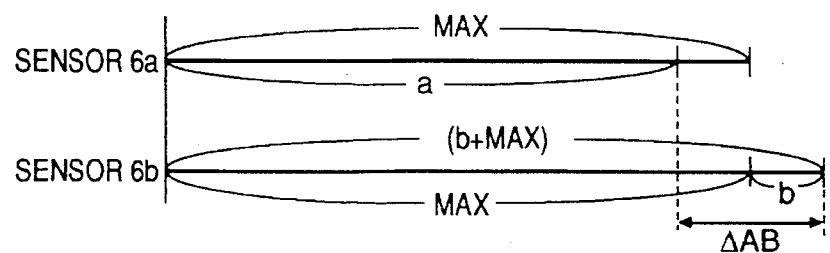

In step S53 in FIG. 7, whether or not the largest difference data is smaller than the obtained difference data is determined. If YES, the obtained difference data is corrected in step S55. That is, if the difference between the count values of the reference sensor 6a and the sensor 6b is used and the difference is over the maximum counter value, the resulting difference data becomes different from actual difference data. For this reason, when the largest difference data is smaller than obtained difference data, the obtained difference data is modified to a correct value. In FIG. 8A, the obtained difference data $\Delta AB$, $\Delta AC$ and $\Delta AD$ with respect to the sensors 6b, 6c and 6d are compared with the largest difference data. At each comparison, if difference data is greater than the largest difference data, it is considered that a counter has counted over the maximum count value MAX, then the maximum value MAX is added to the smaller count value. FIGS. 8B and 8C show a case where $\Delta AB$ is greater than the largest difference data.

In FIGS. 8B and 8C, when the maximum count value (MAX) $\geq 2 \times$ the largest difference data value the difference data is:

$$|\Delta AB| = |b - a|$$

If the obtained difference data ($\Delta AB$) is greater than the largest difference value (FIG. 8B), it is corrected (FIG. 8C).

The correction results are as follows:

$$|\Delta AB| = |(b + MAX) - a|$$

$$|\Delta AC| = |c - a|$$

$$|\Delta AD| = |d - a|$$

MAX: the largest count value.

<Detection of Vibration Transmission Time (FIGS. 9 and 10)>

The principle of measurement of delay times for vibration transmission to the respective vibration sensors 6a to 6d will be described below.

Figure 9:
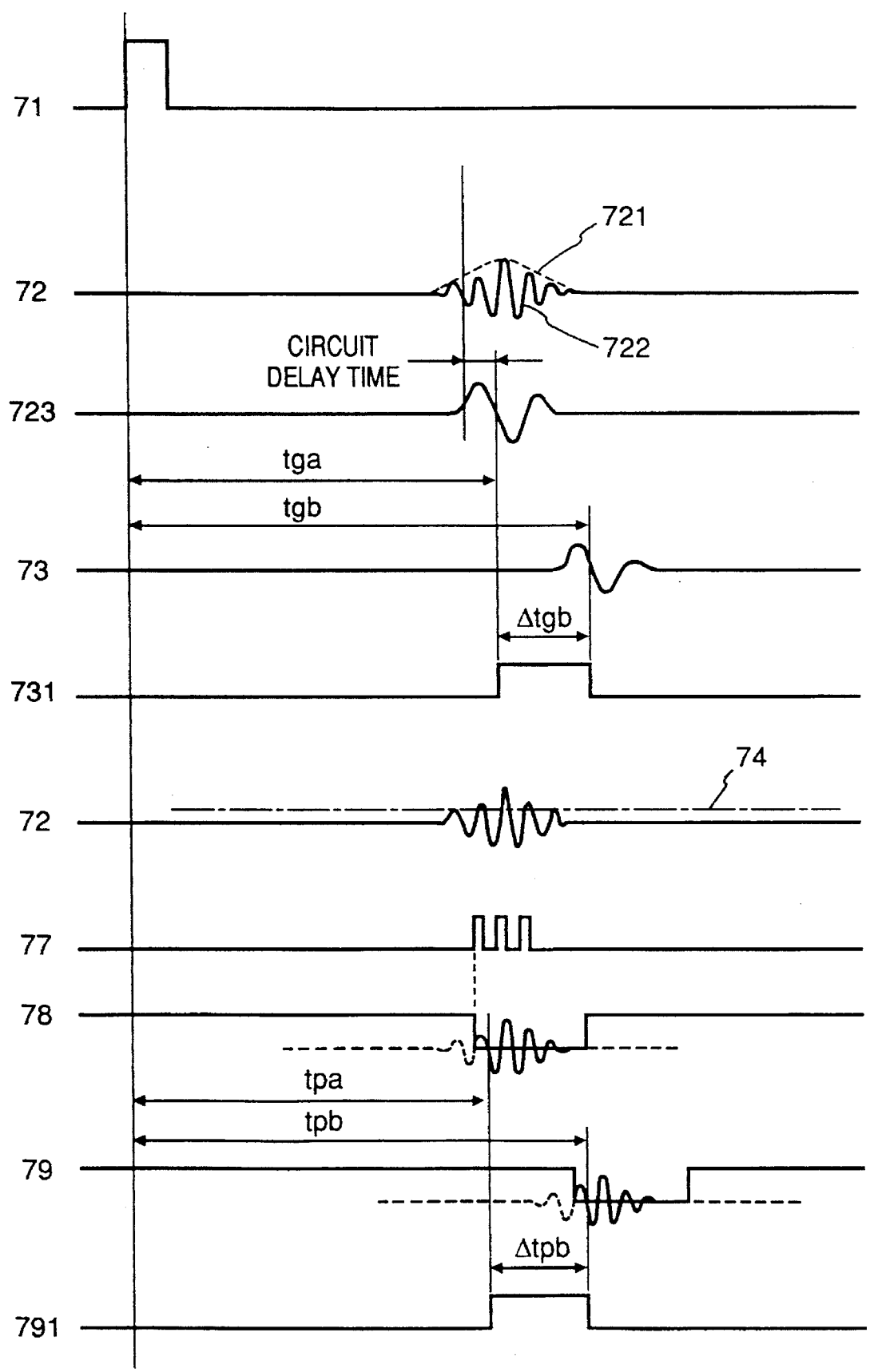
FIG. 9 is a timing chart of signal processing according to the first embodiment.

FIG. 9 is a timing chart for explaining detection waveforms inputted into the signal detector 9 and calculation of delay times for vibration transmission based on these waveforms. Note that the description will be made on detecting the difference between the delay times at the vibration sensors 6a and 6b, however, difference between the delay times at the sensors 6a and 6c, and that between the sensors 6a and 6d are detected in the same way.

The vibrator driver 2 outputs a driving signal 71 to the vibrator 4 at periods out of synchronization with the period of the signal detector 9. The ultrasonic vibration, transmitted by the signal 71 onto the vibration transmitting tablet 8 by the vibrating pen 3, travels for time tga, corresponding to the distance from the input point and the vibration sensor 6a, then is detected by the sensor 6a.

Numeral 72 denotes a signal waveform detected by the sensor 6a. As the vibration in this embodiment is a plate wave, the relation between an envelope 721 and a phase 722 of the detected waveform changes in correspondence with the transmission distance of the vibration. The traveling speed of the envelope 721, i.e., a group speed is referred to as "Vg", and the phase speed of the phase 722, "Vp". The distance between the vibrating pen 3 and the vibration sensor 6a is determined from the group speed Vg and the phase speed Vp.

First, with regard to the envelope 721, having the speed Vg, if a point of a specific waveform, e.g., a zero-crossing point of the second-differential waveform 723 of the envelope 721, i.e., an inflection point of the envelope waveform is detected, the distance between the vibrating pen 3 and the sensor 6a is given, with the vibration transmission time tga:

$$da = Vg \cdot tga \quad (1)$$

This equation is for the vibration sensor 6a, however, similar equations are used to represent the distances between the pen 3 and the other sensors 6b to 6d. The distance difference $\Delta db$ between the distance da, from the vibrating pen 3 to the sensor 6a and the distance db from the pen 3 to the sensor 6b is obtained from the following equation, with the difference between the vibration transmission time tgb (signal 73) indicative of time for transmitting the vibration to the sensor 6b, and the transmission time tga as vibration transmission time 731 ($\Delta tgb$):

$$\Delta db = Vg \cdot tgb - Vg \cdot tga = Vg \cdot \Delta tgb \quad (2)$$

Further, for more precise coordinate determination, processing based on detection of phase signals is performed. Time tpa is the time from a specific detection point of the phase signal 722, e.g., a vibration application point, to a zero-crossing point of a predetermined level signal 74 after the vibration has been applied. Distance da between the vibration sensor 6a and the vibrating pen 3 is:

$$da = na \cdot \lambda p + Vp \cdot tpa \quad (3)$$

λp: elastic wavelength
na: integer

The time tpa is obtained by generating a predetermined window signal 78, having a predetermined width, at the initial rising point of a signal 77 after the comparison between the phase signal 722 and the predetermined level signal 74, and by comparing the signal 78 with the phase signal 722. The distance difference $\Delta db$ between the distance from the pen 3 to the sensor 6a and the distance from the pen 3 to the sensor 6b is given, with a time $\Delta tpb$ between the time tpa and a zero-crossing point tpb:

$$\begin{aligned}\Delta db &= nb \cdot \lambda p + Vp \cdot tpb - (na \cdot \lambda p + Vp \cdot tpa) \\ &= (nb - na) \cdot \lambda p + Vp \cdot (tpb + tpa) \\ &= nb' \cdot \lambda p + Vp \cdot \Delta tpb \end{aligned} \quad (4)$$

nb,nb': integer

From the equations (2) and (4), the integer nb' is:

$$nb' = \text{int}\left[ (Vg \cdot \Delta tgb - Vp \cdot \Delta tpb)/\lambda p + \frac{1}{N} \right] \quad (5)$$

N is a real number other than "0". For example, if $N \leq 2$ holds, the nb' can be determined when tg variation is within $\pm\frac{1}{2}$ wavelength. The obtained nb' is substituted into the equation (4), thus the distance difference $\Delta db$ between the distance from the vibrating pen 3 to the sensor 6a and the distance from the pen 3 to the sensor 6b is precisely calculated. The signal detector 9 generates signals 731 and 791 for detecting the vibration-transmission time difference $\Delta tg$ and $\Delta tp$.

Figure 10:
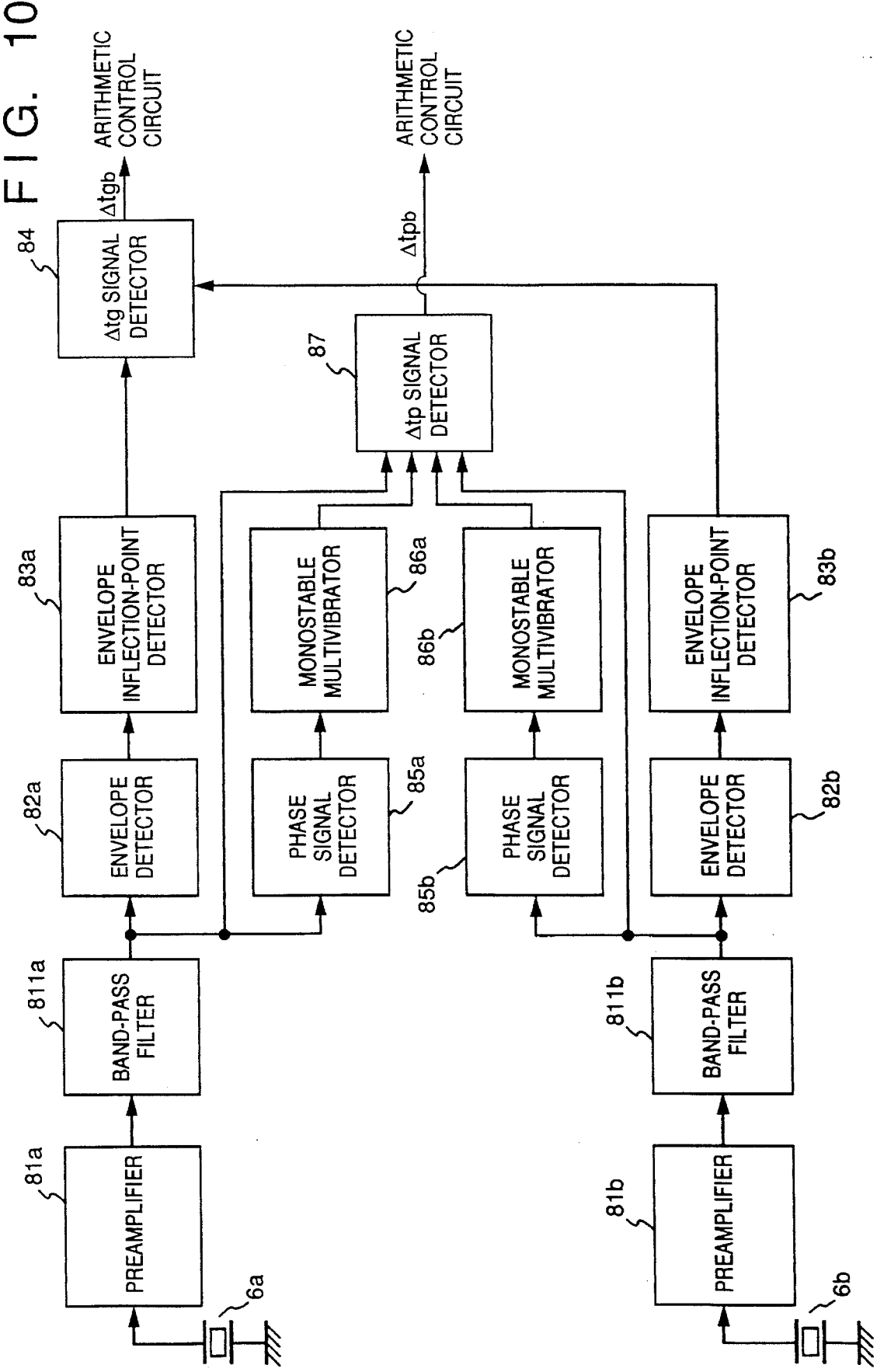
FIG. 10 is a block diagram showing the construction of a signal detector in FIG. 1.

FIG. 10 is a block diagram showing a part of the signal detector 9, for detecting the delay time differences $\Delta tgb$ and $\Delta tpb$ between the vibration sensor 6a and the 6b. The signal detector 9 also includes the same circuit construction for determining the delay time difference between the sensors 6a and 6c and between the sensors 6a and 6d. In FIG. 10, the output signals from the sensors 6a and 6b enter preamplifiers 81a and 81b which respectively amplify the signals to predetermined levels, then enter band-pass filters 811a and 811b where surplus frequency components are removed from the amplified signals. Thereafter, the signals enter envelope detectors 82a and 82b, comprising an absolute value circuit and a low-pass filter, where only envelopes of the signals are taken. Envelope inflection-point detectors 83a and 83b detect the timings of envelope inflection points. A $\Delta tg$ signal detector 84, comprising of such element as a monostable multivibrator, generates an envelope delay time difference signal $\Delta tg$ (841 in FIG. 8) between the two sensors 6a and 6b from the outputs from the inflection-point detectors 83a and 83b, and inputs the signal $\Delta tg$ into the arithmetic control circuit 1.

On the other hand, a signal detector 85a generates a pulse signal 77 indicative of signal portion which exceeds a predetermined threshold signal 74 within a signal waveform 72 detected by the vibration sensor 6a. A monostable multivibrator 86a opens a gate signal 78 at predetermined periods triggered by the initial rising point of the pulse signal 77. A $\Delta tp$ signal detector 87 detects a zero-crossing point during the initial rising of the phase signal 722 while the gate signal 78 is open, and inputs an output signal from a monostable multivibrator 86b with respect to the signal detected by the vibration sensor 6b. Thus, the delay time difference signal $\Delta tp$ 791 between the phase signals of the two sensors can be supplied to the arithmetic control circuit 1. Note that the above description is directed to the vibration sensors 6a and 6b, however, similar circuit construction are provided for the other combinations of the sensors.

<Coordinate Position Calculation (FIGS. 11 and 12)>

Next, the principle of calculating coordinates at a vibration input position by the vibrating pen 3 will be described.

Figure 11:
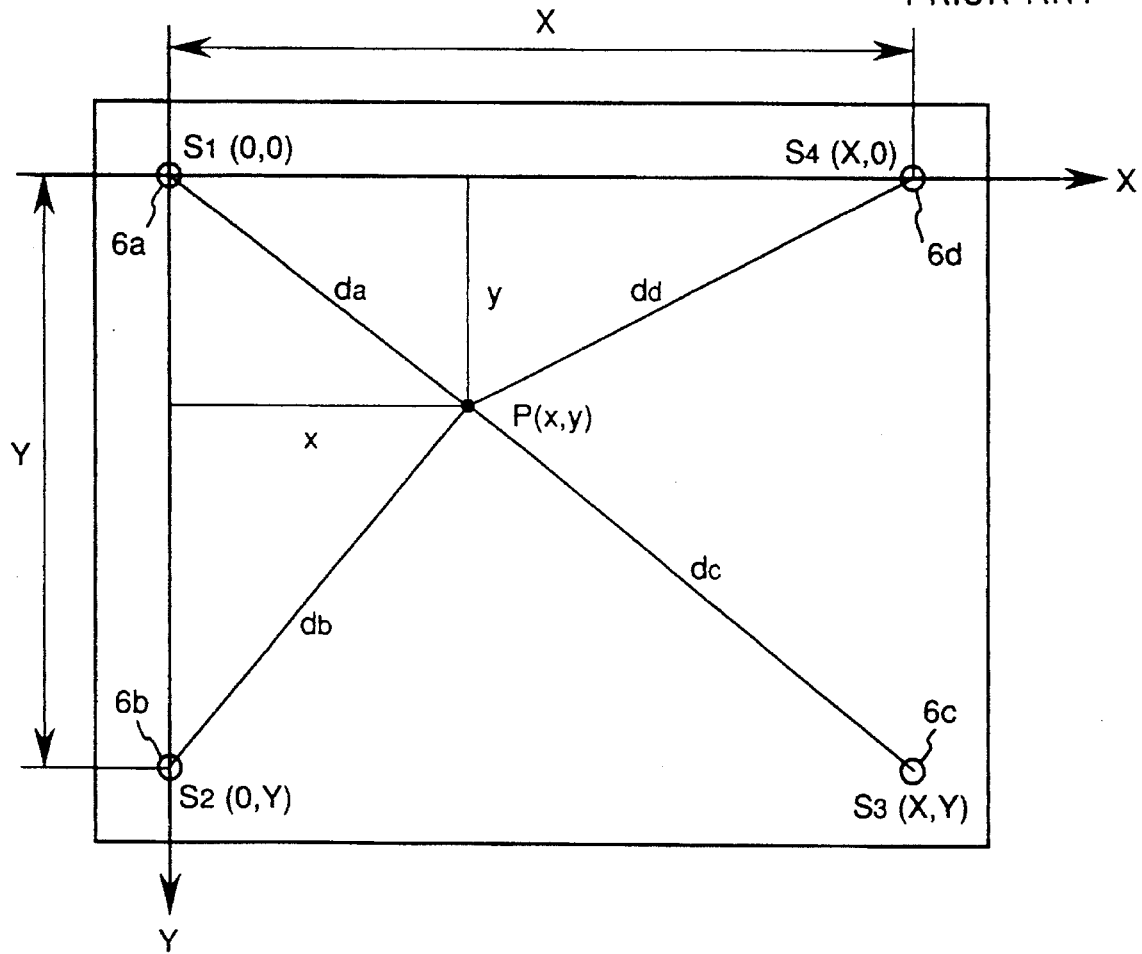
FIG. 11 illustrates coordinate calculation in a conventional coordinate input apparatus.
Figure 12:
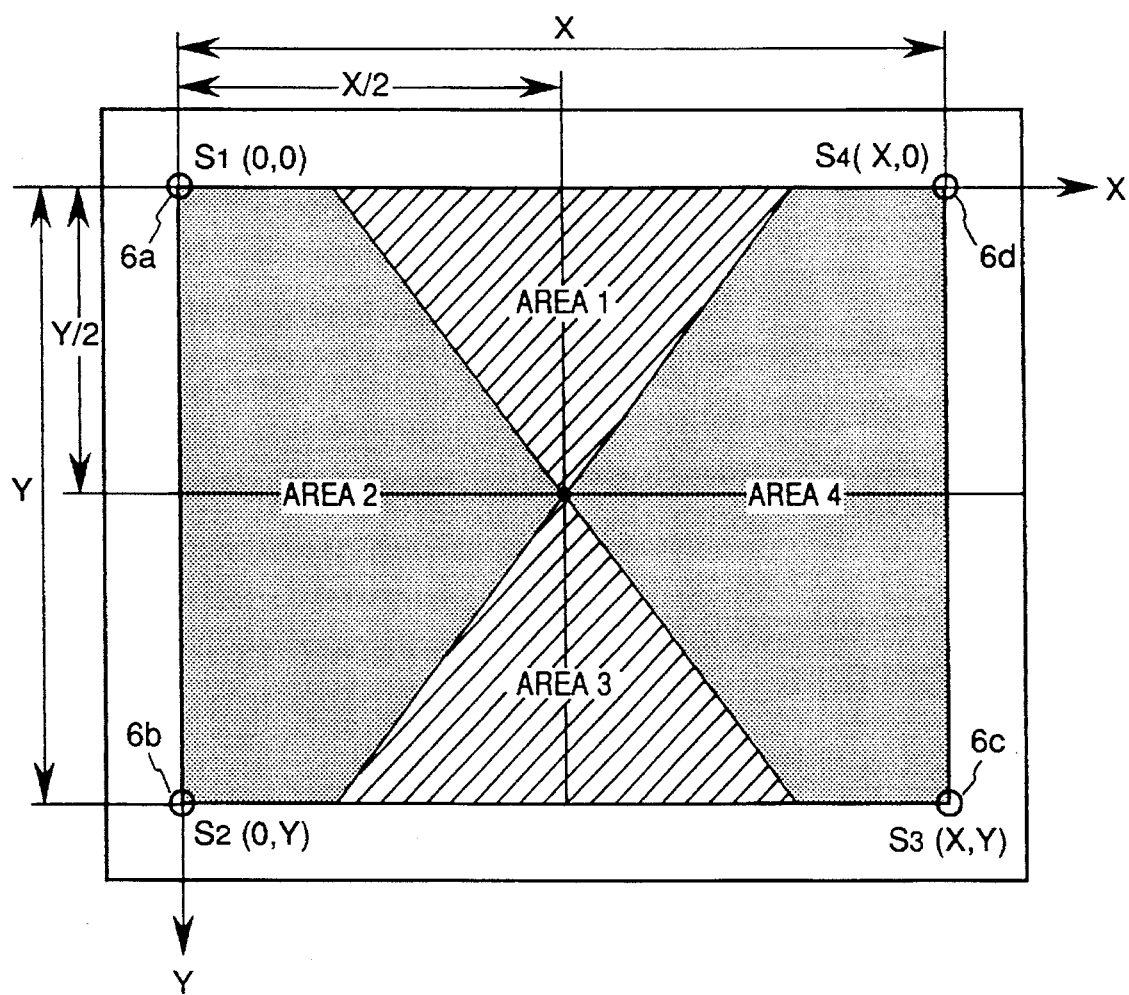
FIG. 12 illustrates coordinate calculation areas corresponding to the signal process timings in FIG. 9.

In FIGS. 11 and 12, the vibration sensors 6a to 6d are provided at positions $S_1$ to $S_4$ on the four corners of the vibration transmitting tablet 8. The straight distances from the vibrating pen 3 to the vibration sensors 6a to 6d are da to dd according to the aforementioned principle of detecting vibration transmission time. Then, the distance differences $\Delta db \sim \Delta dd$ are obtained from the distances between the distance da, i.e., the distance from the pen 3 to the sensor 6a, and the distances db–dd, i.e., the distances from the pen 3 to the sensors 6b to 6d:

$$db = \Delta db + da \quad (6)$$

$$dc = \Delta dc + da \quad (7)$$

$$dd = \Delta dd + da \quad (8)$$

Next, coordinates (x, y) at a position P of the vibrating pen 3 are obtained using the Pythagorean theorem:

$$da^2 = x^2 + y^2 \quad (9)$$

$$db^2 = (\Delta db + da)^2 = x^2 + (Y-y)^2 \quad (10)$$

$$dc^2 = (\Delta dc + da)^2 = (X-x)^2 + (Y-y)^2 \quad (11)$$

$$dd^2 = (\Delta dd + da)^2 = (X-x)^2 + y^2 \quad (12)$$

X: distance between the sensors 6a and 6b
Y: distance between the sensors 6c ad 6d
Next, from (10)–(9), (11)–(12), $$\Delta db^2 + 2da \cdot \Delta db = Y^2 - 2Y \cdot y \quad (13)$$

$$\Delta dc^2 - \Delta dd^2 + 2da \cdot (\Delta dc - \Delta dd) = Y^2 - 2Y \cdot y \quad (14)$$

The distance da is obtained from the difference between the equations (13) and (14):

$$da = \frac{\Delta db^2 + \Delta dd^2 - \Delta dc^2}{2(\Delta dd + \Delta db - \Delta dc)} \quad (15)$$

When this equation holds, the denominator in the right member is not "0". The solution of the equation (15) when this denominator is "0" will be described later. y is obtained by substituting the equation (15) into the equation (14):

$$y = \frac{Y}{2} - \frac{\Delta dd^2}{2Y} + \frac{\Delta db(\Delta db^2 + \Delta dd^2 - \Delta dc^2)}{2Y(\Delta db + \Delta dd - \Delta dc)} \quad (16)$$

Similarly, x is obtained as follows:

$$x = \frac{X}{2} - \frac{\Delta dd^2}{2X} + \frac{\Delta db(\Delta db^2 + \Delta dd^2 - \Delta dc^2)}{2X(\Delta db + \Delta dd - \Delta dc)} \quad (17)$$

Note that the equation (17) holds when:

$$\Delta dd + \Delta db - \Delta dc \neq 0 \quad (18)$$

Next, a case where the equation (18) does not hold will be considered. When the equations (6) to (8) are substituted into an equation $\Delta dd + \Delta db - \Delta dc$, if the denominator in the right member is "0", $$dd + db = dc + da \quad (19)$$

This equation holds when x=X/2 or y=Y/2, and da=dd and db=dc, or da=db and dc=dd.

When it is judged that the equation (18) does not hold, the process jumps to a coordinate calculation subroutine, to solve an x or y quadratic equation.

First, if x=X/2 (at this time, $\Delta db = \Delta dc$) holds, the equations (9) to (12) become as follows:

$$da^2 = \frac{X^2}{4} + y^2 \quad (20)$$

$$(\Delta db + da)^2 = \frac{X^2}{4} + (Y-y)^2 \quad (21)$$

y is obtained by substituting da obtained from (21)–(20):

$$y = \frac{(Y \pm \text{sqrt}(A))}{2} \quad (22)$$

$$A = \Delta db^2 \left( 1 + \frac{X^2}{Y^2 - \Delta db^2} \right) \quad (23)$$

In the equation (22), ± becomes "–" when $\Delta db>0$, while it becomes "+" when $\Delta db<0$. squrt (X) is a function which gives a square root of X.

Similarly, when y=Y/2, x is obtained as follows:

$$x = \frac{(X \pm \text{sqrt}(B))}{2} \quad (24)$$

$$B = \Delta dd^2 \left( 1 + \frac{Y^2}{X^2 - \Delta dd^2} \right) \quad (25)$$

Note that ± becomes "–" when $\Delta dd>0$, while it becomes "+" when $\Delta dd<0$.

However, around y=Y/2, values of $\Delta db$ and $\Delta db + \Delta dd - \Delta dc$ are close to "0", accordingly, the second and third terms in the equation (16) substantially become "0". This results in excellent precision as to a y-coordinate while bad precision as to an x-coordinate, since data error of time-measurement in $\Delta dd$ influences the equation (17) at around y=Y/2.

Similarly, around x=X/2, values of $\Delta dd$ and $\Delta db + \Delta dd - \Delta dc$ are close to "0", accordingly, the second and third terms in the equation (17) substantially become "0", thus resulting in excellent precision as to an x-coordinate while bad precision as to a y-coordinate, due to influence from data error of time-measurement in $\Delta db$.

These problems are solved by obtaining a y-coordinate with high precision at around y=Y/2 and then obtaining an x-coordinate from the obtained y-coordinate, similarly, at round x=X/2, by obtaining an x-coordinate with high precision and then obtaining a y-coordinate from the obtained x-coordinate.

Next, as shown in FIG. 12, an input area is divided into four areas on the following conditions:

Area 1: $\Delta db>0$ AND $\Delta dc>0$ AND $\Delta db<\Delta dd$

Area 2: $\Delta dd<0$ AND $\Delta dc<0$ AND $\Delta db<\Delta dd$

Area 1: $\Delta db>0$ AND $\Delta dc<0$ AND $\Delta db>\Delta dd$

Area 1: $\Delta dd>0$ AND $\Delta dc>0$ AND $\Delta db>\Delta dd$

In the areas 1 and 3, an x-coordinate is calculated using the equation (17). A y-coordinate is calculated by substituting the equation (17) into the equation (10):

$$y = \frac{Y}{2} \pm \frac{\Delta db \times \text{sqrt}(C)}{2} \quad (26)$$

$$C = \frac{4x^2}{Y^2 - \Delta db^2} + 1 \quad (27)$$

In the equation (26), ± of the second term becomes "–" in the area 1 when:

$$y < \frac{Y}{2} \text{ and } \Delta db > 0$$

In the area 3, ± becomes "–" when:

$$y > \frac{Y}{2} \text{ and } \Delta db < 0$$

Similarly, in the areas 2 and 4, a y-coordinate is calculated using the equation (16). An x-coordinate is calculated by substituting the equation (16) into the equation (12):

$$x = \frac{X}{2} \pm \frac{\Delta dd \times \text{sqrt}(D)}{2} \quad (28)$$

$$D = \frac{4y^2}{X^2 - \Delta dd^2} + 1 \quad (29)$$

In the equation (28), ± of the second term becomes "−" in the area 2 when:

$$x < \frac{X}{2} \text{ and } \Delta dd > 0$$

In the area 4, ± becomes "−" when:

$$x > \frac{X}{2} \text{ and } \Delta dd < 0$$

Figure 13:
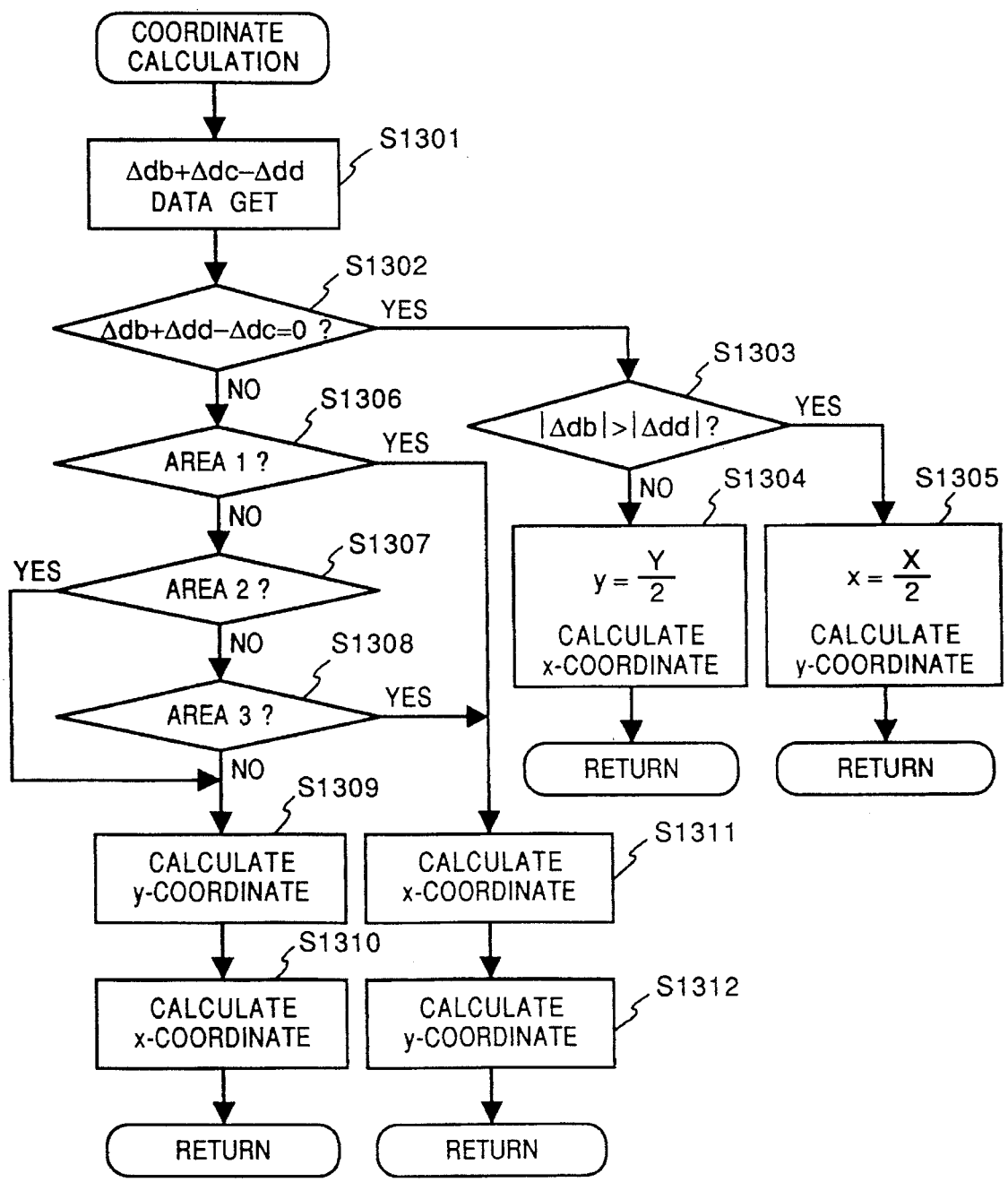
FIG. 13 is a flowchart showing the coordinate calculation.

FIG. 13 shows the above coordinate calculation.

In step S1301, calculation according to $\Delta db + \Delta dc - \Delta dd$ is performed. In step S1302, whether the obtained value is "0" or not is determined. If YES, the vibrating pen 3 is around on a line x=X/2 or y=Y/2. Then, |Δdb| and |Δdd| are compared in step S1303. If x=X/2 holds, |Δdd|=0, while if y=Y/2 holds, |Δdb|0. Then, if |Δdb|>|Δdd| holds, the process proceeds to step S1305 in which a y-coordinate is obtained with x=X/2, and the point P(x, y) coordinates are calculated.

On the other hand, if NO in step S1302, i.e., it is determined that $\Delta db + \Delta dc - \Delta dd \neq 0$, an area including the point P (x, y) is determined in steps S1306 to S1308. In case of the area 1 or 3, the x-coordinate is obtained using the equation (17) in step S1311, and the y-coordinate is obtained using the equation (26) in step S1312. In case of the area 2 or 4, the y-coordinate is calculated using the equation (16) in step S1309, and the x-coordinate is calculated using the equation (28) in step S1310.

In this manner, the coordinates at the position of the vibrating pen 3 can be directly detected from a signal indicative of difference between vibration signal arrival times at the sensors in a real-time manner. Time for transmitting the vibration within the pen 3 (offset for the arrival delay time) is counterbalanced between two sensors, and the vibration transmission time in the pen (especially at the pen tip) receives no influence from temperature change. This avoids erroneous input and degradation of input precision.

Further, as the vibrating-pen input is not synchronized with the operation of the coordinate input apparatus main body, a cordless-type pen can be used as the vibrating pen, as in the present embodiment. However, the pen 3 can be connected with the apparatus main body via a cord for receiving a driving signal from the apparatus main body.

Moreover, the reference vibration sensor 6a may be replaced with any of the other sensors similarly for measuring the difference between vibration arrival times at the other sensors, and coordinate calculation as described above can be made based on the measured value.

[Second Embodiment]

The construction of the coordinate input apparatus and that of the vibrating pen according to the second embodiment are identical to those in the first embodiment as shown in FIG. 1. In this embodiment, as a plate-wave characteristic, vibration transmission speed depends upon the product of frequency and plate thickness. For this reason, variations in sensors and circuits cause changes in the transmission speed and the frequency. Though the first embodiment obtains the wavelength λ, the group velocity Vg and the phase velocity Vp, as constants, based on average values among the four sensors, the present embodiment uses an average value between one pair of sensors to obtain delay time difference data, i.e., the average value between the constants at the reference sensor and those at one of the other sensors, for calculating coordinates.

Assuming that the reference sensor 6a and the sensor 6b are in a pair for a channel of a counter for obtaining delay time difference data, the average value between constants at the two sensors are a wavelength λpb, a group velocity Vgb and a phase velocity Vpb. The distance difference Δdb between the distance da from the vibrating pen 3 to the sensor 6a and the distance db from the pen 3 to the sensor 6b is obtained, with respective group delay times tga and tbg:

$$\Delta db = db - da = Vgb \cdot (tgb - tga) = Vgb \cdot \Delta tgb \tag{30}$$

Further, processing based on the phase signal obtains:

$$\begin{aligned}\Delta db &= nb \cdot \lambda p + Vpb \cdot (tpb - tpa) \\ &= nb \cdot \lambda pb + Vpb \cdot \Delta tpb\end{aligned} \tag{31}$$

nb: integer

From the equations (30) and (31), the integer nb is:

$$nb = \text{int}\left[\frac{Vgb \cdot \Delta tgb - Vgb \cdot \Delta tgb}{\lambda gb + 1} + \frac{1}{N}\right] \tag{32}$$

N: real number equal to or less than "0"

Δdb can be obtained with high precision by substituting the nb obtained using the equation (32) into the equation (31).

In case of the vibration sensors 6a and 6c, and the sensors 6a and 6d, Δdc and Δdd are similarly obtained using the average value between the constants at the sensor 6a and those at the sensor 6c, and between the constants at the sensor 6a and those at the sensor 6d.

As described above, the difference among the distances from the vibration source to the respective sensors can be obtained with high precision based on the average value between the constants at the two sensors. This improves coordinate calculation precision.

Thus, the first and second embodiments can improve coordinate calculation precision with a small-sized circuit construction.

[Third Embodiment]

The construction of the coordinate input apparatus is identical to that in the first and second embodiments as shown in FIG. 1.

Figure 14:
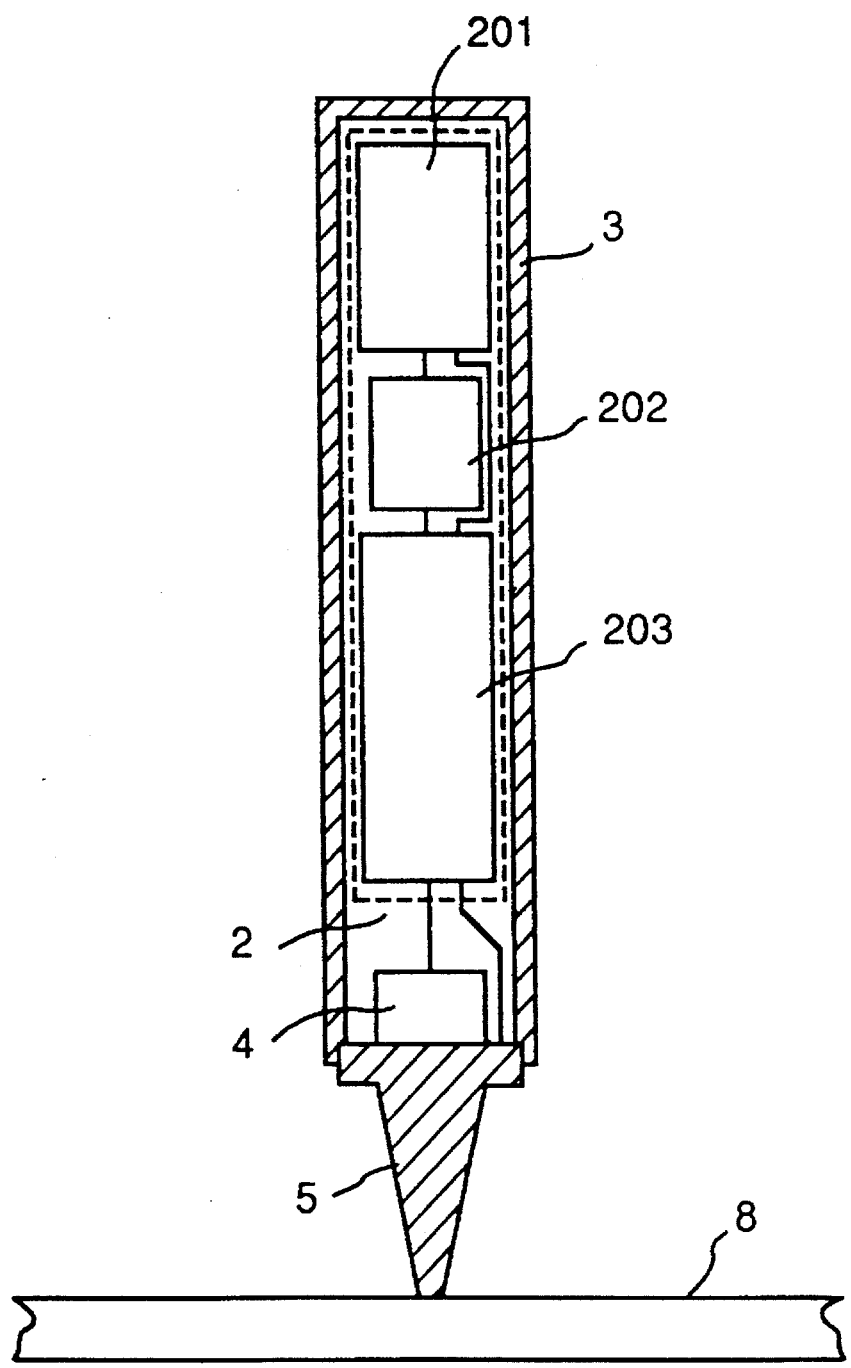
FIG. 14 is a cross-sectional view of a vibrating pen according to a third embodiment.

FIG. 14 shows the construction of the vibrating pen 3 according to the third embodiment.

In the vibrating pen 3, the vibrator driver 2, comprising a power 201, a timer 202 and vibration circuit 203, drives the vibrator 4. A driving signal for the vibrator 4 is a pulse signal having a predetermined repetition period, generated from the timer 202 and amplified by the vibration circuit 203 to a predetermined level. The timing of the repetition period of the driving signal is not synchronized with the operation of the arithmetic control circuit 1. The timer 202 and the vibration circuit 203 receive electric power from the power 201 comprising such as a battery. The electric driving signal is converted by the vibrator 4 into a mechanical vibration, and transmitted via the pen tip 5 onto the vibration transmitting tablet 8.

Similar to the first embodiment, the vibration frequency of the vibrator 4 is selected to have a value for generating Lamb waves on the vibration transmitting tablet 8 comprising such as a glass plate. Further, selecting a resonance frequency of the pen tip 5 as the vibration frequency of the vibrator 4 enables effective vibration conversion. Thus, elastic waves to be transmitted on the vibration transmitting tablet 8 are Lamb waves which, compared with a surface wave, advantageously receive smaller influence from scratches and obstacles on the transmitting panel surface.

<Arithmetic Control Circuit>

In the above-described construction, the vibrator driver 2 outputs a driving signal for the vibrator 4 at predetermined periods (e.g., 5 ms). The vibration from the vibrating pen 3 travels on the vibration transmitting tablet 8, to reach the sensors 6a to 6d with delays respectively corresponding to the distances from the pen 3 to the sensors. The signal detector 9 detects signals from the sensors 6a to 6d, and generates signals indicative of differences between the vibration arrival timing at the reference sensor 6a and those at the respective sensors 6b to 6d. The arithmetic control circuit 1 inputs the signals with respect to all the combinations between the reference sensor 6a and the sensors 6b to 6d, obtains difference among those time differences, and calculates coordinates at the vibration input position by the vibrating pen 3. Further, the arithmetic control circuit 1 drives the display driver 10 based on the calculated coordinates of the pen 3, for display control at the display 11, otherwise, serial communication control or parallel communication control to output the coordinate information to an external device.

Figure 15:
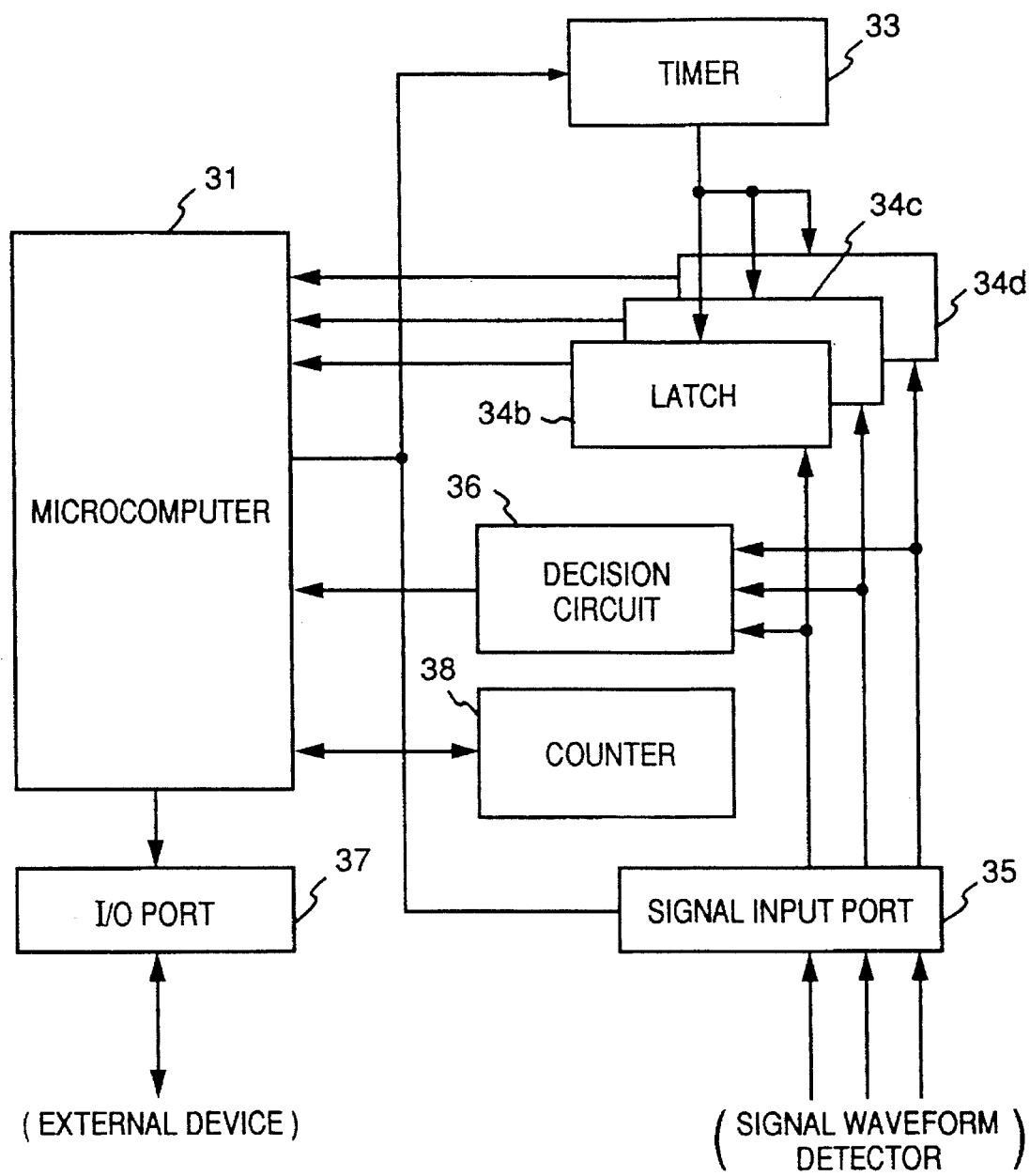
FIG. 15 is a block diagram showing the construction of an arithmetic control circuit according to the third embodiment.

FIG. 15 shows the construction of the arithmetic control circuit 1 according to the third embodiment.

In FIG. 15, a microcomputer 31 controls the arithmetic control circuit 1 and the overall coordinate input apparatus. The microcomputer 31 comprises a counter, a ROM in which operation procedures are stored, a RAM for calculations and a non-volatile memory for storing constants. A timer 33, comprising e.g. a counter, measures a reference clock (not shown) timing. The timer 33 measures the difference between transmission delay time at the reference sensor 6a and that at the sensors 6b to 6d, and inputs the measured data into latches 34b to 34d. Note that the other elements will be described later.

The signals indicative of the differences among the vibration-arrival times between the sensor 6a and the respective sensors 6b to 6d, outputted from the signal detector 9 enter the latches 34b to 34c via a signal input port 35. The latches 34b to 34d, respectively corresponding latches for the vibration sensors 6b to 6d, latch time-measurement value at the timer 33 while it receives a vibration-arrival difference signal between a corresponding sensor and the reference sensor 6a. A decision circuit 36 determines when all the vibration-arrival difference signals have been received, and outputs a signal informing the determination result to the microcomputer 31.

The microcomputer 31 receives the signal from the decision circuit 36, and reads the respective vibration-arrival delay differences regarding the sensors 6b to 6d out of the latches 34b to 34d, for predetermined calculation to obtain the coordinates at the vibration input position by the vibrating pen 3 on the vibration transmitting tablet 8. The microcomputer 31 outputs the calculated coordinate information to the display driver 10 via an I/O port 37, thus, e.g., displays a dot at a corresponding position on the display 11. Otherwise, the microcomputer 31 outputs the coordinate value to an external device by outputting the coordinate information to an interface via the I/O port 37.

Also, the microcomputer 31 outputs a signal to a counter 38, which terminates time-measurement, outputs a measured count value to the microcomputer 31, and restarts measuring. That is, the counter 38 measures intervals between the arrival of vibration, i.e., the vibrator-driving repetition period. The microcomputer 31 inputs the counter 38 output, i.e., the measured vibrator-driving repetition period, and when the output value exceeds a predetermined value or vice versa, executes pre-programmed processings, e.g., displaying a message "RECHARGE BATTERY" at the display 11.

Further, the microcomputer 31 detects the peak position on the detected waveforms at the sensors 6a to 6d and time which exceeds a predetermined level (amplitude) or a phase of a detected signal, and measures the vibration-arrival delay time differences from the timing differences among the plural sensors.

<Vibrating Pen>

Figure 16:
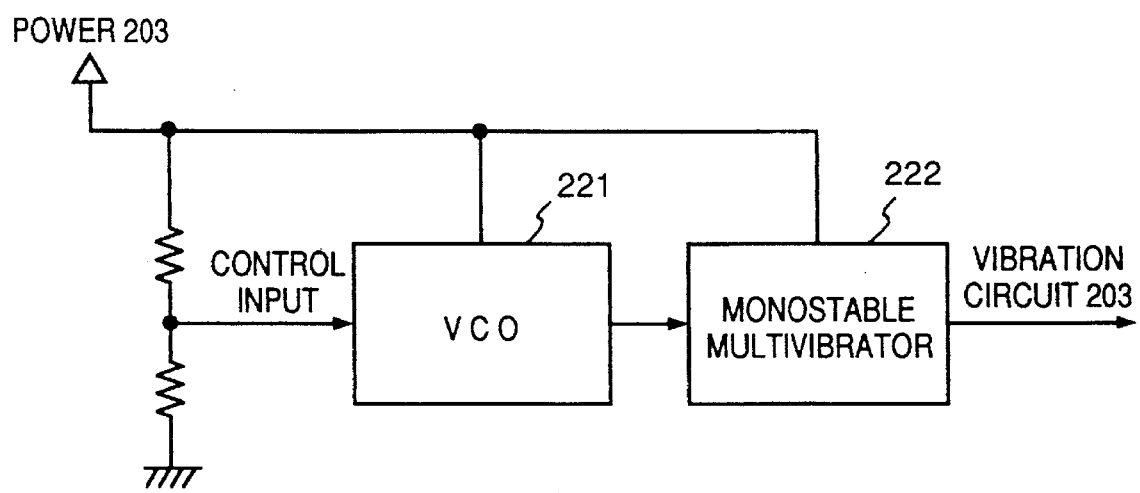
FIG. 16 is a block diagram showing the construction of a pen timer in FIG. 14.

FIG. 16 shows an example of the construction of the timer 202 in the vibrator driver 2. A voltage control oscillator (VCO) 221 generates a rectangular wave having repetition period of the driving-signal to be applied to the vibrator 4. As the VCO 221 receives at its frequency control terminal a voltage having a value in proportion to that of the power, the vibration frequency varies in accordance with change in the power voltage value. The rectangular wave from the VCO 221 enters a monostable multivibrator 222 which outputs a pulse having a predetermined pulsewidth at the timing of the rising or falling point of the rectangular wave. Note that the predetermined pulsewidth is a value for determining the vibration frequency of the vibrator 4. Assuming that a necessary frequency is f, the pulsewidth is obtained from 1/2f (sec).

The monostable multivibrator 222 output enters the vibration circuit 203, in which it is amplified to a predetermined level or power-amplified to have a necessary current value, then applied to the vibrator 4.

In the above construction, the frequency of the rectangular wave outputted from the VCO 221 varies in correspondence with the power 21 voltage, and the vibrator 4 outputs a vibration pulse at intervals corresponding to the frequency. The vibration from the vibrator 4 is transmitted onto the vibration transmitting tablet 8, and inputted via the sensors 6a to 6d into the arithmetic control circuit 1, in which the counter 38 measures time intervals among the arrivals of the vibration. The microcomputer 31 inputs the power voltage change as the time intervals measured by the counter 38.

Next, the principle of measuring the difference among the vibration-arrival delay times from the vibration input to the vibration sensors 6a to 6d for calculating coordinates of the vibrating pen will be briefly described below.

The values latched by the latches 34b to 34d are differences between vibration transmission times from a point where the vibration is inputted from the vibration pen 3 to respective points where the sensors 6b to 6d receive the vibration and vibration transmission time from a point where the vibration is inputted from the vibration pen 3 to a point where the sensor 6a receives the vibration. The signal detector 9 in the present embodiment has the same construction as that of the first embodiment in FIG. 10. The latches 34b to 34d latch phase-signal delay time differences $\Delta tpb$, $\Delta tpc$ and $\Delta tpd$ and group delay time differences $\Delta tgb$, $\Delta tgc$ and $\Delta tgd$.

The coordinate calculation is made based on the obtained delay time differences with the same procedure as that in the first embodiment.

It should be noted that the present embodiment also employs a wireless coordinate input apparatus, however, a wired-type coordinate input apparatus with a vibrating pen including a power source can be employed.

Further, the present embodiment also uses a coordinate input apparatus of a ultrasonic-vibration type utilizing acoustic vibration, however, any other method (e.g., electrostatic coupling and electromagnetic induction) for generating a periodic signal is applicable. In such cases, the apparatus differs from the first to third embodiments in that it uses an input pen as a radio wave generator which transmits a radio wave via air or glass as a radio-wave transmitting medium, detectors comprising a coil-shaped conductor pattern formed on an input surface, and radio wave traveling among these elements.

The present invention can be applied to a system constituted by a plurality of devices, or to an apparatus comprising a single device. Furthermore, the invention is applicable also to a case where the object of the invention is attained by supplying a program to a system or apparatus.

As described above, the present invention provides a voltage measuring device and a coordinate input apparatus using the device, which has a small size and an energy-saving characteristic, moreover, which informs a user of the residual amount of power in the vibration input source.

The present invention is not limited to the above embodiments and various changes and modifications can be made within the spirit and scope of the present invention. Therefore, to apprise the public of the scope of the present invention, the following claims are made.

What is claimed is:

1. A coordinate input apparatus comprising:

input means for inputting vibration;

a vibration transmission body for transmitting the vibration;

a plurality of vibration sensors for detecting the vibration transmitted on said vibration transmission body;

a plurality of counters respectively corresponding to said vibration sensors;

measurement means for measuring a time difference based on a difference between a count value at a point where one of the vibration sensors, as a reference sensor, detects the vibration transmitted on said vibration transmission body, and a count value at a point where another one of the vibration sensors detects the vibration;

control means for controlling said measurement means to perform measurement of time differences at the other vibration sensors, at predetermined time periods to eliminate reverberation;

decision means for deciding an area on said vibration transmission body, as an area in which the vibration has been inputted; and leading means for leading coordinates at a vibration source position, based on the time differences measured by said measurement means corresponding to the area decided by said decision means, wherein the sensors are provided at four corners of a rectangular-shaped surface of said vibration transmission body, and wherein the areas are divided by two diagonals of the same length respectively formed by two sensors at opposing vertices of the rectangular-shaped surface.

2. The apparatus according to claim 1, wherein said measurement means measures a phase time difference and an envelope time difference, and said leading means leads the coordinates based on the phase time difference and the envelope time difference using predetermined equations.

3. The apparatus according to claim 1, wherein said input means periodically outputs pulse-formed vibration asynchronously with operation of said measurement means.

4. A coordinate input apparatus comprising:

input means for inputting vibration;

a vibration transmission body for transmitting the vibration;

vibration detection means having a plurality of vibration sensors provided on said vibration transmission body;

measurement means for measuring a time difference between a reference delay time from a point where the vibration has been transmitted onto the vibration transmission body to a point where one of said vibration sensors, as a reference sensor, detects the vibration, and a delay time from the point where the vibration has been transmitted onto the vibration transmission body to a point where another one of the vibration sensors detects the vibration;

control means for controlling said measurement means to measure time differences between the reference delay time and delay times at the other vibration sensors;

decision means for deciding an area of said vibration has been inputted, based on the time differences measured by said measurement means; and calculation means for calculating coordinates at a vibration source position, corresponding to the area decided by said decision means and the time difference measured by said measurement means, wherein the sensors are provided at four corners of a rectangular-shaped surface of said vibration transmission body, and wherein the areas are divided by two diagonals of the same length respectively formed by two sensors at opposing vertices of the rectangular-shaped surface.

5. The apparatus according to claim 4, wherein said measurement means measures a phase time difference and an envelope time difference, and said calculation means calculates the coordinates based on the phase time difference and the envelope time difference using predetermined equations.

6. The apparatus according to claim 4, wherein said measurement means has a counter, and wherein if the time difference measured by said measurement means exceeds a predetermined maximum value, said measurement means determines that the counter has counted over a maximum count value, and corrects the time difference.

7. The apparatus according to claim 4, wherein said input means periodically outputs pulse-formed vibration asynchronously with operation of said measurement means.

8. The apparatus according to claim 4, wherein said control means remains idle for a predetermined period to eliminate reverberation at an interval between time difference measurement operations by said measurement means.

9. A coordinate input apparatus comprising:

input means for inputting vibration;

a vibration transmission body for transmitting the vibration;

a plurality of vibration detection means for detecting the vibration on said vibration transmission body at different positions;

measurement means for measuring delay times at points where the vibration inputted by said input means is detected by said plurality of detection means;

means for calculating a difference value at one of said plurality of detection means by subtracting one of the delay times measured by said measurement means from the delay times at the other detection means;

decision means for comparing the difference values at said detection means with a predetermined value and deciding any of the difference values or the predetermined value as a larger value;

correction means for correcting the difference value based on a decision result by said decision means; and calculation means for calculating coordinates of a vibration source position on said vibration transmission body, where the vibration has been inputted by said input means, based on the difference value corrected by said correction means, wherein the predetermined value is a maximum difference count value determined in accordance with a vibration transmission speed of the vibration inputted by said input means and the size of said vibration transmission body, and wherein said calculation means comprises means for deciding an area of said vibration transmission body as an area in which the vibration has been inputted, and calculates coordinates corresponding to the respective areas.

10. The apparatus according to claim 4, wherein said measurement means measures a group delay time and a phase delay time upon vibration transmission.

11. A coordinate input method comprising:

an input step of inputting vibration;

a detection step of detecting the vibration transmitted on a vibration transmission body;

a measurement step of measuring a time difference based on a difference between a count value at a point where a predetermined vibration sensor detects the vibration transmitted on the vibration transmission body, and a count value at a point where another vibration sensor detects the vibration;

a control step of controlling measurement in said measurement step to be performed at the other vibration sensors, at predetermined time periods to eliminate reverberation;

a decision step of deciding an area on the vibration transmission body, as an area in which the vibration has been inputted; and a leading step of leading coordinates at a vibration source position, based on the time differences measured in said measurement step corresponding to the area decided in said decision step, wherein the sensors are provided at four corners of a rectangular-shaped surface of the vibration transmission body, and wherein the areas are divided with two diagonals of the same length respectively formed by two sensors at opposing vertices of the rectangular-shaped surface.

12. A method according to claim 11, wherein a phase time difference and an envelope time difference are measured in said measuring step, and the coordinates are lead based on the phase time difference and the envelope time difference using predetermined equations in said leading step.

13. The method according to claim 11, wherein in said input step, pulse-formed vibration is periodically outputted asynchronously with operation in said measurement step.

14. A coordinate input method comprising:

an input step of inputting vibration;

a vibration detection step of detecting the vibration with a plurality of vibration sensors provided on a vibration transmission body;

a measurement step of measuring a time difference between a reference delay time from a point where the vibration has been transmitted onto the vibration transmission body to a point where one of the vibration sensors, as a reference sensor, detects the vibration, and a delay time from the point where the vibration has been transmitted onto the vibration transmission body to a point where another one of the vibration sensors detects the vibration;

a control step of controlling measurement in said measurement step to be performed regarding time differences between the reference delay time and delay times at the other vibration sensors;

a decision step of deciding an area of the vibration transmission body, as an area in which the vibration has been inputted, based on the time differences measured in said measurement step; and a calculation step of calculating coordinates at a vibration source position corresponding to the area decided in said decision step and the time differences measured by said measurement step, wherein the sensors are provided at four corners of a rectangular-shaped surface of the vibration transmission body, and wherein the areas are divided by two diagonals of the same length respectively formed by two sensors at opposing vertices of the rectangular-shape surface.

15. The method according to claim 14, wherein a phase time difference and an envelope time difference are measured in said measurement step, and the coordinates are calculated in said calculation step based on the phase time difference and the envelope time difference using predetermined equations.

16. The method according to claim 14, wherein in said measurement step, a counter is used in said measurement step, and wherein if the time difference measured exceeds a predetermined maximum value, it is determined that the counter has counted over a maximum count value, and the time difference is corrected.

17. The method according to claim 14, wherein in said input step, pulse-formed vibration is periodically outputted asynchronously with operation in said measurement step.

18. The method according to claim 14, wherein operation in said control step is suspended for a predetermined period to eliminate reverberation at an interval between time difference measurement operations in said measurement step.

19. A coordinate input method comprising:

an input step of inputting vibration onto a vibration transmission body;

a plurality of vibration detection steps for detecting the vibration at different positions;

a measurement step of measuring delay times at points where the vibration inputted in said input step are detected in said plurality of detection steps;

a step of calculating a difference value at one of said plurality of detection steps by subtracting one of the delay times measured in said measurement step from the delay times in the other detection steps;

a decision step of comparing the difference values in said detection steps with a predetermined value and deciding any of the difference value or the predetermined value as a larger value;

a correction step of correcting the difference value based on a decision result in said decision step; and a calculation step of calculating coordinates at a vibration source position on the vibration transmission body, where the vibration has been inputted in said input step, based on the difference value corrected in said correction step, wherein the predetermined value is a maximum difference value determined in accordance with a vibration transmission speed of the vibration inputted in said input step and the size of the vibration transmission body, and wherein said calculation step includes a step of deciding an area of the vibration transmission body as an area in which the vibration has been inputted, and coordinates are calculated corresponding to the respective areas.

20. The method according to claim 19, wherein a group delay time and a phase delay time upon vibration transmission are measured in said measurement step.

* * * * *

UNITED STATES PATENT AND TRADEMARK OFFICE
CERTIFICATE OF CORRECTION

PATENT NO. : 5,565,893

DATED : October 15, 1996

INVENTOR(S): HAJIME SATO, ET AL.

It is certified that error appears in the above-identified patent and that said Letters Patent is hereby corrected as shown below:

[75] INVENTORS

"Inzal-machi," should read --Inzai-machi,--.

[57] ABSTRACT

Line 5, "sensor" should read --sensors--.
Line 18, "obtain" should read --obtains--.

COLUMN 1

Line 18, "is" should read --are--.
Line 44, "$\Delta db + \Delta dd - dc \neq 0$     (106)
    should read --$\Delta db + \Delta dd - \Delta dc \neq 0$     (106)--.

COLUMN 8

Line 28, "of" should be deleted.

COLUMN 9

Line 8, "$(Y \dot{-} y)^2$ should read --$(Y-y)^2$--.
Line 12, "ad" should read --and--.

COLUMN 13

Line 34, "detector 9" should read --detector 9,--.

UNITED STATES PATENT AND TRADEMARK OFFICE
CERTIFICATE OF CORRECTION

PATENT NO. : 5,565,893

DATED : October 15, 1996

INVENTOR(S): HAJIME SATO, ET AL.

Page 2 of 2

It is certified that error appears in the above-identified patent and that said Letters Patent is hereby corrected as shown below:

COLUMN 17

Line 10, "claim 4" should read --claim 9--.
    Line 42, "are lead" should read --are read--.

COLUMN 18

Line 38, "are" should read --is--.
    Line 46, "value" should read --values--.

Signed and Sealed this

Seventh Day of October, 1997

Attest:

BRUCE LEHMAN

Attesting Officer

Commissioner of Patents and Trademarks